United States Patent
Sastry et al.

(10) Patent No.: US 9,627,709 B2
(45) Date of Patent: Apr. 18, 2017

(54) AMORPHOUS CATHODE MATERIAL FOR BATTERY DEVICE

(71) Applicant: SAKTI3, INC., Ann Arbor, MI (US)

(72) Inventors: Ann Marie Sastry, Ann Arbor, MI (US); Chia-Wei Wang, Ypsilanti, MI (US); Yen-Hung Chen, Ann Arbor, MI (US); Hyoncheol Kim, Ann Arbor, MI (US); Xiang Chun Zhang, Ann Arbor, MI (US); Myoundo Chung, Ann Arbor, MI (US)

(73) Assignee: Sakti3, Inc., Ann Arbor, MI (US)

( * ) Notice: Subject to any disclaimer, the term of this patent is extended or adjusted under 35 U.S.C. 154(b) by 88 days.

(21) Appl. No.: 14/514,779

(22) Filed: Oct. 15, 2014

(65) Prior Publication Data

US 2016/0240884 A1 Aug. 18, 2016

(51) Int. Cl.
*H01M 10/0562* (2010.01)
*H01M 10/04* (2006.01)
(Continued)

(52) U.S. Cl.
CPC ..... *H01M 10/0413* (2013.01); *H01M 4/0402* (2013.01); *H01M 4/483* (2013.01);
(Continued)

(58) Field of Classification Search
CPC ....... H01M 10/0585; H01M 2004/028; H01M 2/145; H01M 4/0423; H01M 4/1391;
(Continued)

(56) References Cited

U.S. PATENT DOCUMENTS 2,862,646 A 12/1958 Hayford et al.
4,009,052 A 2/1977 Whittingham
(Continued)

FOREIGN PATENT DOCUMENTS

EP 1593754 A1 11/2005
JP 05-320906 A 12/1993
(Continued)

OTHER PUBLICATIONS

International Search Report and Written Opinion for PCT/US2015/049515, mailed Nov. 10, 2015.
(Continued)

*Primary Examiner* — Patrick Ryan
*Assistant Examiner* — Ben Lewis
(74) *Attorney, Agent, or Firm* — Morrison & Foerster LLP

(57) ABSTRACT

A method of fabricating a multilayered thin film solid state battery device. The method steps include, but are not limited to, the forming of the following layers: substrate member, a barrier material, a first electrode material, a thickness of cathode material, an electrolyte, an anode material, and a second electrode material. The formation of the barrier material can include forming a polymer material being configured to substantially block a migration of an active metal species to the substrate member, and being characterized by a barrier degrading temperature. The formation of cathode material can include forming a cathode material having an amorphous characteristic, while maintaining a temperature of about −40 Degrees Celsius to no greater than 500 Degrees Celsius such that a spatial volume is characterized by an external border region of the cathode material. The method can then involve transferring the resulting thin film solid state battery device.

19 Claims, 28 Drawing Sheets

(51) Int. Cl.

| | | |
|---|---|---|
| *H01M 4/04* | (2006.01) | |
| *H01M 4/48* | (2010.01) | |
| *H01M 4/58* | (2010.01) | |
| *H01M 6/40* | (2006.01) | |
| *H01M 10/0585* | (2010.01) | |
| *H01M 10/052* | (2010.01) | |
| *H01M 4/02* | (2006.01) | |

(52) U.S. Cl.
CPC ........... *H01M 4/5825* (2013.01); *H01M 6/40* (2013.01); *H01M 10/04* (2013.01); *H01M 10/0436* (2013.01); *H01M 10/052* (2013.01); *H01M 10/0585* (2013.01); *H01M 2004/021* (2013.01); *H01M 2220/10* (2013.01); *H01M 2220/20* (2013.01); *H01M 2220/30* (2013.01)

(58) Field of Classification Search
CPC ........ H01M 4/382; H01M 4/48; H01M 4/483; H01M 6/40; H01M 10/0431; H01M 10/054; H01M 16/00; H01M 2/1077; H01M 4/0421
See application file for complete search history.

(56) References Cited

U.S. PATENT DOCUMENTS

| | | | |
|---|---|---|---|
| 4,648,347 A | 3/1987 | Aichert et al. | |
| 4,854,264 A | 8/1989 | Noma et al. | |
| 4,933,889 A | 6/1990 | Meshkat et al. | |
| 5,107,791 A | 4/1992 | Hirokawa et al. | |
| 5,338,625 A | 8/1994 | Bates et al. | |
| 5,367,465 A | 11/1994 | Tazawa et al. | |
| 5,377,118 A | 12/1994 | Leon et al. | |
| 5,402,366 A | 3/1995 | Kihara et al. | |
| 5,411,592 A | 5/1995 | Ovshinsky et al. | |
| 5,453,934 A | 9/1995 | Taghavi et al. | |
| 5,498,489 A | 3/1996 | Dasgupta et al. | |
| 5,571,749 A | 11/1996 | Matsuda et al. | |
| 5,751,591 A | 5/1998 | Asada | |
| 5,906,757 A | 5/1999 | Kong et al. | |
| 6,016,047 A | 1/2000 | Notten et al. | |
| 6,294,479 B1 | 9/2001 | Ebe et al. | |
| 6,350,222 B2 | 2/2002 | Susnjara | |
| 6,402,443 B1 | 6/2002 | Hoppe | |
| 6,656,234 B2 | 12/2003 | Dexter et al. | |
| 6,833,031 B2 | 12/2004 | Arnold | |
| 6,884,333 B2 | 4/2005 | Landau | |
| 6,924,164 B2 | 8/2005 | Jenson | |
| 6,962,823 B2 | 11/2005 | Empedocles et al. | |
| 6,982,132 B1 | 1/2006 | Goldner et al. | |
| 7,107,193 B1 | 9/2006 | Hummel et al. | |
| 7,194,801 B2 | 3/2007 | Jenson et al. | |
| 7,294,209 B2 | 11/2007 | Shakespeare | |
| 7,315,789 B2 | 1/2008 | Plett | |
| 7,361,327 B2 | 4/2008 | Tumas et al. | |
| 7,490,710 B1 | 2/2009 | Weskamp et al. | |
| 7,553,584 B2 | 6/2009 | Chiang et al. | |
| 7,579,112 B2 | 8/2009 | Chiang et al. | |
| 7,618,742 B2 | 11/2009 | Kaplin et al. | |
| 7,625,198 B2 | 12/2009 | Lipson et al. | |
| 7,945,344 B2 | 5/2011 | Wang et al. | |
| 8,168,326 B2 | 5/2012 | Chiang et al. | |
| 2002/0120906 A1 | 8/2002 | Xia et al. | |
| 2002/0169620 A1 | 11/2002 | Spotnitz et al. | |
| 2003/0064292 A1 | 4/2003 | Neudecker et al. | |
| 2003/0068559 A1 | 4/2003 | Armstrong et al. | |
| 2003/0082446 A1 | 5/2003 | Chiang et al. | |
| 2003/0099884 A1 | 5/2003 | Chiang et al. | |
| 2003/0108800 A1 | 6/2003 | Barbarich | |
| 2004/0131761 A1 | 7/2004 | Shakespeare | |
| 2004/0131925 A1 | 7/2004 | Jenson et al. | |
| 2004/0131937 A1 | 7/2004 | Chen et al. | |
| 2004/0144321 A1 | 7/2004 | Grace et al. | |
| 2004/0151985 A1 | 8/2004 | Munshi | |
| 2004/0185667 A1 | 9/2004 | Jenson | |
| 2004/0258851 A1 | 12/2004 | Selvamanickam et al. | |
| 2005/0079418 A1 | 4/2005 | Kelley et al. | |
| 2005/0114105 A1 | 5/2005 | Barber | |
| 2005/0244580 A1 | 11/2005 | Cok et al. | |
| 2006/0138350 A1 | 6/2006 | Banine et al. | |
| 2006/0156978 A1 | 7/2006 | Lipson et al. | |
| 2007/0110892 A1 | 5/2007 | Awata et al. | |
| 2007/0186852 A1 | 8/2007 | Sakata et al. | |
| 2007/0218329 A1 | 9/2007 | Keith et al. | |
| 2008/0118782 A1 | 5/2008 | Heller et al. | |
| 2008/0187832 A1 | 8/2008 | Takezawa et al. | |
| 2008/0259976 A1 | 10/2008 | Hrudey et al. | |
| 2008/0280206 A1 | 11/2008 | Oukassi | |
| 2009/0061090 A1 | 3/2009 | Negishi | |
| 2009/0157369 A1 | 6/2009 | Li et al. | |
| 2009/0217876 A1 | 9/2009 | Epstein | |
| 2009/0304906 A1 | 12/2009 | Suduo et al. | |
| 2009/0326696 A1 | 12/2009 | Wang et al. | |
| 2010/0015361 A1 | 1/2010 | Negishi | |
| 2010/0035152 A1 | 2/2010 | Sastry et al. | |
| 2010/0082142 A1 | 4/2010 | Usadi et al. | |
| 2010/0159330 A1* | 6/2010 | Sugiura | H01M 4/131 429/231.4 |
| 2010/0190051 A1 | 7/2010 | Aitken et al. | |
| 2011/0165326 A1 | 7/2011 | Little et al. | |
| 2011/0202159 A1 | 8/2011 | Wang et al. | |
| 2011/0217578 A1 | 9/2011 | Albano et al. | |
| 2011/0301931 A1 | 12/2011 | Gering | |
| 2011/0318498 A1 | 12/2011 | Wadley et al. | |
| 2012/0040233 A1 | 2/2012 | Kim et al. | |
| 2012/0058280 A1 | 3/2012 | Chung et al. | |
| 2012/0058380 A1* | 3/2012 | Wang | H01M 4/0423 429/153 |
| 2012/0115028 A1 | 5/2012 | Ueno et al. | |
| 2012/0237826 A1* | 9/2012 | Kim | H01M 4/505 429/217 |
| 2014/0102878 A1 | 4/2014 | Zhang et al. | |
| 2014/0106229 A1 | 4/2014 | Hirschler et al. | |

FOREIGN PATENT DOCUMENTS

| | | |
|---|---|---|
| JP | 06-116722 A | 4/1994 |
| JP | 2004-319449 A | 11/2004 |
| JP | 2005-093373 A | 4/2005 |
| JP | 2005-353759 A | 12/2005 |

OTHER PUBLICATIONS

International Search Report and Written Opinion of PCT Application No. PCT/US2009/047848, filed on Jun. 18, 2009.
Salvador Aceves et al., "Computer Modeling in the Design and Evaluation of Electric and Hybrid Vehicles", 11th Annual National Educator's Workshop Standard Experiments in Engineering Materials, Science, and Technology, Oct. 27-30, 1996, 12 pages retrieved from the Internet: <<http://www.osti.gov/bridge/servlets/purl/381678-Unwv9F/webviewable/381678.pdf>>, Lawrence Livermore National Laboratory, Los Alamos, New Mexico.
Y. H. Chen et al., "Selection of Conductive Additives in Li-Ion Battery Cathodes: A Numerical Study", Journal of the Electrochemical Society, 2007, pp. A978-A986, vol. 154, No. 10, The Electrochemical Society.
Chia-Wei Wang et al., "Mesoscale Modeling of a Li-Ion Polymer Cell," Journal of the Electrochemical Society, 2007, pp. A1035-A1047, vol. 154, No. 11, The Electrochemical Society.
Marc Doyle et al., "Computer Simulations of a Lithium-Ion Polymer Battery and Implications for Higher Capacity Next-Generation Battery Designs", Journal of the Electrochemical Society, 2003, pp. A706-A713, vol. 150 No. 6, The Electrochemical Society.
Gerbrand Ceder et al., "Computational Modeling and Simulation for Rechargeable Batteries", MRS Bulletin, Aug. 2002, pp. 619-623.
International Search Report and Written Opinion of PCT Application No. PCT/US2009/047846, filed on Jun. 18, 2009.
Office Action for U.S. Appl. No. 13/294,980, dated Jan. 20, 2012.
Notice of Allowance for U.S. Appl. No. 13/294,980, dated Jul. 11, 2012.

(56) References Cited

OTHER PUBLICATIONS

Korean Office Action for Korean Patent Application No. 10-2011-7001484, dated Jul. 4, 2012.
Office Action for U.S. Appl. No. 13/292,663, dated Aug. 2, 2012.
Office Action for U.S. Appl. No. 12/484,966, dated Jul. 6, 2012.
European Search Report for PCT/US2009/047848, dated Oct. 11, 2012.
Q.H. Zeng et al., "Multiscale Modeling and Simulation of Polymer Nanocomposites", Progress in Polymer Science, Dec. 3, 2007, pp. 191-269, vol. 33, No. 2, Elseview Ltd.
Office Action for U.S. Appl. No. 13/103,008, dated Jan. 9, 2013.
Office Action for U.S. Appl. No. 13/291,845, dated Nov. 26, 2012.
Office Action for U.S. Appl. No. 13/292,663, dated Feb. 27, 2013.
Office Action for U.S. Appl. No. 13/103,004, dated Mar. 15, 2013.
Notice of Allowance for U.S. Appl. No. 13/648,429, dated Mar. 15, 2013.
Notice of Allowance for U.S. Appl. No. 13/911,015, dated Aug. 16, 2013.
Office Action for U.S. Appl. No. 13/086,825, dated Oct. 17, 2012.
Office Action for U.S. Appl. No. 13/086,825, dated Apr. 26, 2013.
Office Action for U.S. Appl. No. 13/415,774, dated Oct. 1, 2013.
European Search Report for European Patent Application No. 09767760.3, received Jun. 14, 2013.
Japanese Office Action for Japanese Patent Application No. 2011-514817, dated Jan. 24, 2014.

\* cited by examiner

| cathode material | diffusivity (m²/s) | diffusivity (m²/s) | (S/m) | (S/m) |
|---|---|---|---|---|
| $LiCoO_2$ | ~$10^{-19}$ | ~$10^{-12}$ | ~$10^{-7}$ | ~$10^4$ |
| $LiMn_2O_4$ | ~$10^{-17}$ | ~$10^{-12}$ | ~$10^{-6}$ | ~1 |
| $LiFePO_4$ | ~$10^{-22}$ | ~$10^{-12}$ | ~$10^{-8}$ | ~10 |
| $LiV_2O_5$ | ~$10^{-17}$ | ~$10^{-15}$ | ~$10^{-6}$ | ~$10^{-1}$ |

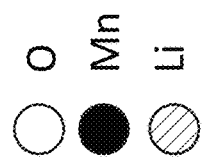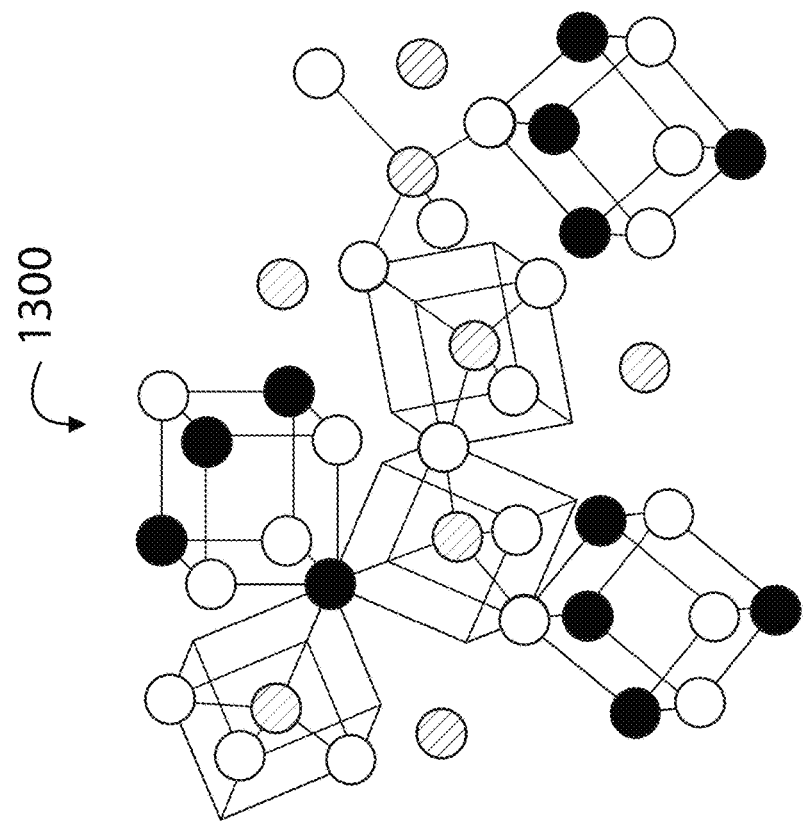
FIGURE 13

| cell sample # | diffusivity (m²/s) | energy density (Wh/l) |
|---|---|---|
| 81-23001-7 | $2.08 \times 10^{-17}$ | 547 |
| 84-10001-2 | $3.14 \times 10^{-17}$ | 680 |

FIGURE 20

AMORPHOUS CATHODE MATERIAL FOR BATTERY DEVICE

BACKGROUND OF THE INVENTION

The present invention relates generally to fabricating a thin film electrochemical energy storage device or a solid-state battery device. In particular, the present invention provides techniques for an improved cathode material, among other features. More particularly, the present invention provides techniques using multiple active layers and interlayers for the manufacture of a solid state battery device.

Common electro-chemical cells often use liquid electrolytes. Such cells are typically used in many conventional applications. Alternative techniques for manufacturing electro-chemical cells include solid-state cells. Such solid state cells are generally in the experimental state, have been difficult to make, and have not been successfully produced in large scale. Although promising, solid state cells have not been achieved due to limitations in cell structures and manufacturing techniques. These and other limitations have been described throughout the present specification and more particularly below.

From the above, it is seen that techniques for improving the manufacture of solid state cells are highly desirable.

BRIEF SUMMARY OF THE INVENTION

According to the present invention, techniques for fabricating a thin film electrochemical energy storage device or a solid-state battery device are included. In particular, the present invention provides techniques for an improved cathode material, among other features. More particularly, present invention provides a method for fabricating a thin film electrochemical energy storage device or an all solid-state device to achieve better performance and longer cycle lifetime by using multiple active and inter thin film layers serving either as stress mitigation means, thermal control means, ionic diffusion prevention means, ionic diffusion enhancing means, enhancing electrical conduction means, electrical insulation means, adhesion means, or the most importantly planarizing means for subsequent layers. The performance of those devices can either be electrical-chemical conversion efficiency, photovoltaic conversion efficiency, electrical conduction, electrical insulation, or high/low temperature operational capabilities.

The thin film energy storage device, and all solid-state devices that the method of present invention can apply to, can be used for a variety of applications such as a solar panel, a consumer electronic device, a vehicle, or an electrical grid; wherein the consumer electronic devices include, but not limited to: display device, MP3 players, smartphones, tablets, laptop computers, smartwatches, activity trackers, and other wearable devices; wherein the vehicles include, but not limited to: hybrid electric buses, electric buses, hybrid electric cars, electric cars, electric bicycles, electric motorcycles, electric scooters, electric golf carts, trains, ships, airplanes, electric airplanes, helicopters, unmanned aerial vehicles, electric unmanned aerial vehicles, drones, other aerial vehicles, space stations, space shuttles, space planes, satellites, unmanned spacecrafts, other spacecrafts, and other hybrid electric vehicles, plug-in hybrid electric vehicles, and electric vehicles; and wherein the electrical grid includes, but not limited to stand-alone micro-grids for residential homes, commercial buildings, and communities, and centralized electrical grids. Furthermore, such energy storage devices can be used for telecommunication systems, cellphone and antenna towers, data centers, and uninterruptable power supplies.

In an example, the cathode material can be deposited so as to produce observable discontinuities, taking the form of any combination of poly disperse generalized cones, which may variously, with changes in inclination of the conical surface relative to the substrate, be platelets, cones, inverted cones or right circular cylinders, surface discontinuities which variously appear as fissures, continuous or discontinuous polyhedral elements, holes, cracks or other defects, additive, deposited layers, any of the aforementioned geometries, in combination with three-dimensional, irregular, deposited poly-hedral structures, among others. Of course, there can be other variations, modifications, and alternatives.

In an example, the present invention can provide a method of fabricating a multilayered thin film solid state battery device. The steps involved in this method include, but are not limited to, the following: providing a substrate member, forming a barrier material, forming a first electrode material, forming a thickness of cathode material, forming an electrolyte, forming an anode material, forming a second electrode material, and transferring a thin film solid state battery device.

In an example, the substrate member can include a surface region and can be characterized by a melting point temperature. The barrier material can be formed overlying the surface region of the substrate member. This barrier material can include a polymer material and can be configured to substantially block a migration of an active metal species to the substrate member. Also, the barrier material can be characterized by a barrier degrading temperature. The first electrode material can be formed overlying the surface region as well.

In an example, the thickness of cathode material can have an amorphous characteristic. The formation of this cathode material can be executed while maintaining a temperature ranging from about −40 Degrees Celsius to no greater than 500 Degrees Celsius. Also, the formation of the cathode material can be such that a spatial volume is characterized by an external border region of the cathode material, the thickness of cathode material is characterized by an effective diffusivity having a value ranging from $1.\text{E-}18\ m^2/s$ to $1.\text{E-}4\ m^2/s$, and the cathode material is characterized by a void region being 0.001% to 80% of the spatial volume.

In a specific example, the thickness of cathode material can include a first thickness of amorphous material and a second thickness of material. The first thickness of cathode material can be greater than the second thickness, and the first thickness of amorphous material can be different in structure than the second thickness of material. The cathode material can also include a surface morphology. In a specific example, the effective diffusivity includes a first diffusivity of the first thickness and a second diffusivity of the second thickness.

In a specific example, the cathode material includes a lithium species, the lithium species being selected from at least one of LiSON, $Li_xLa_{1-x}ZrO_3$, $Li_xLa_{1-x}TiO_3$, LiAlGePO$_4$, LiAlTiPO$_4$, LiSiCON, $Li_{1.3}Al_{0.3}Ti_{1.7}(PO_4)_3$, $0.5LiTaO_{3+0.5}SrTiO_3$, $Li_{0.34}La_{0.51}TiO_{2.94}$, $LiAlCl_4$, $Li_7SiPO_8$, $Li_9AlSiO_8$, $Li_3PO_4$, $Li_3SP_4$, LiPON, $Li_7La_3Zr_2O_{12}$, $Li_{1.5}Al_{0.5}Ge_{1.5}(PO_4)_3$, $Li_6PS_5Cl$, or $Li_5Na_3Nb_2O_{12}$. The cathode material can be characterized by a conductivity ranging from 1.E-12 S/m to 1.E6 S/m, by a C rate ranging from C/100 to 100 C, by an XRD peak to total ratio ranging from 0% to 0% crystallinity, and by an average crystallite size ranging from 0.1 nm to 100 nm configured in a spatial region.

In an example, the electrolyte can be configured overlying the cathode material. The anode material can be formed overlying the electrolyte, and the second electrode material can be formed overlying the anode material. The method can then involve transferring the resulting thin film solid state battery device characterized by an energy density ranging from 50 Watt-hour/liter to 3000 Watt-hour/liter.

Benefits are achieved over conventional techniques. Depending upon the specific embodiment, one or more of these benefits may be achieved. In a preferred embodiment, the present invention provides a suitable solid state battery structure including barrier regions. Preferably, the cathode material is configured to provide improved power density for electrochemical cells. The present cathode material can be made using conventional process technology techniques. Of course, there can be other variations, modifications, and alternatives.

The present invention achieves these benefits and others in the context of known process technology. However, a further understanding of the nature and advantages of the present invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 12-19 illustrate crystalline and amorphous structures for various lithium bearing species for cathode devices according to an embodiment of the present invention.

FIGS. 20-22 are values based upon experimental results according to examples of the present invention.

DETAILED DESCRIPTION OF THE INVENTION

Figure 1A:
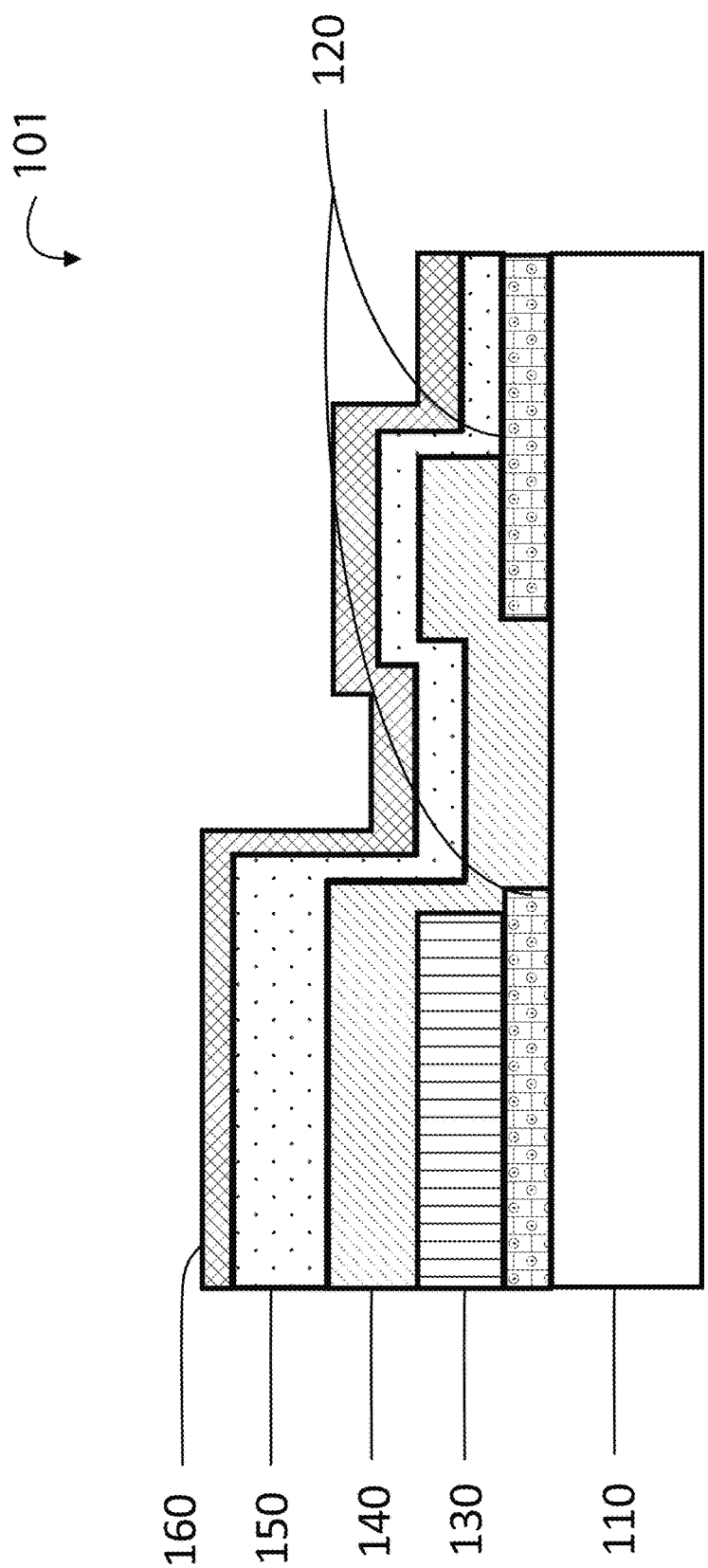
FIG. 1A is a simplified cross-sectional view of thin film electrochemical energy storage cell according to an embodiment of present invention.

According to the present invention, techniques for fabricating a thin film electrochemical energy storage device or a solid-state battery device are included. In particular, the present invention provides techniques for an improved cathode material, among other features. More particularly, the present invention provides techniques using a multiple active and inter layers for the manufacture of a solid state battery device.

Present invention uses techniques related to thin film electrochemical energy storage device and solid-state device fabrications. More particularly, present invention provides a method for fabricating a thin film electrochemical energy storage device or an all solid-state device to achieve better performance and longer cycle lifetime by using multiple active and intermediate thin film layers serving either as stress mitigation means, thermal control means, ionic diffusion prevention means, ionic diffusion enhancing means, enhancing electrical conduction means, electrical insulation means, adhesion means, or the most importantly planarizing means for subsequent layers. The performance of those devices can either be electrical-chemical conversion efficiency, photovoltaic conversion efficiency, electrical conduction, electrical insulation, or high/low temperature operational capabilities.

The thin film energy storage device, and all solid-state devices that the method of present invention can apply to, can be used for a variety of applications such as a solar panel, a consumer electronic device, a vehicle, or an electrical grid; wherein the consumer electronic devices include, but not limited to: display device, MP3 players, smartphones, tablets, laptop computers, smartwatches, activity trackers, and other wearable devices or medical devices; wherein the vehicles include, but not limited to: hybrid electric buses, electric buses, hybrid electric cars, electric cars, electric bicycles, electric motorcycles, electric scooters, electric golf carts, trains, ships, airplanes, electric airplanes, helicopters, unmanned aerial vehicles, electric unmanned aerial vehicles, drones, other aerial vehicles, space stations, space shuttles, spaceplanes, satellites, unmanned spacecrafts, other spacecrafts, and other hybrid electric vehicles, plug-in hybrid electric vehicles, and electric vehicles; and wherein the electrical grid includes, but not limited to stand-alone micro-grids for residential homes, commercial buildings, and communities, and centralized electrical grids. Furthermore, such energy storage devices can be used for telecommunication systems, cellphone and antenna towers, data centers, and uninterruptable power supplies.

In a specific embodiment, the present invention provides a method of using planarizing layers in a thin film electrochemical energy storage system or in an all solid-state thin film devices to overlay flaws and prevent failures. The flaws are referred to the roughness, pinholes, and cracks occurred at the surface of previous layer. These flaws can induce high contact resistance because of bad connection between two consecutively connected layers. They can also cause delamination due to bad adhesion. Furthermore, they can cause fatigue or mechanical failure due to the stress concentration due to induced temperature difference during production process, or induced strain due to volume expansion causing by temperature difference or concentration difference during cyclic loading. These planarizing layers are deposited by using thin-film related deposition process to flatten the flaw on the surface of previously laying down layer. The functions of these planarizing layers includes, but not limited to, mitigate flaws, to prevent mechanical failures, to prevent an oxygen species, a water species, a nitrogen species, and a carbon dioxide species from diffusing into either the first electrochemical/electrical active layer, and to prevent any material comprising the second layer from bonding to, alloying, mixing or forming a composite with the first layer. Furthermore, because the flaws are flattened; therefore, the subsequent deposited layers can have better foundation and better adhesion to achieve better uniformity of the thin film component layers. The materials used to form intermediary thin-film planarizing layers overlying the flaws of electrochemical/electrical active layer(s) within a thin film energy storage device or other solid-state device having inert physical properties, can be categorized into four groups, but not limited to, based on their functions:

A. as electrical/thermal insulator or chemical inertness with low electrical/thermal conductivity;
B. as high thermal conductor with high thermal conductivity;
C. as moisture resistance layer with low ionic species diffusivity or reactivity;
D. as planarizing layer with high wettability and good adhesion force with previous layers to mitigate the stress concentration and decrease contact resistance.

In an alternative embodiment, the materials used to form intermediary one or more thin film planarizing layers overlying the first electrochemical/electrical active layer(s) within a solid state battery or other solid-state thin film device having inert properties to mitigate flaws, to prevent mechanical failures due to an oxygen species, a water species, a nitrogen species, and a carbon dioxide species from diffusing into electrochemical/electrical active layers, or to prevent contamination from bonding to, alloying, mixing or forming a composite with the first layer due to the formation of this intermediated one more thin film layers. The selection of the materials to form this planarizing layer unit is closely depending on its intention. If this planarizing layer is used also for electrical/thermal insulator, or chemical inertness, the materials for this planarizing layer can be selected from a group of ceramic which includes, but not limited to, solda-lime glass, borosilicate glasses, NASICON, similar to LiAlCl4 structure, β or β"-alumina structure, or perovskite-type structure, $aLi_xPO_4$-$bLi_2S$-$cSiS_2$ where a+b+c equals to 1, LiSON, $Li_xLa_{1-x}ZrO_3$, $Li_xLa_{1-x}TiO_3$, $LiAlGePO_4$, $LiAlTiPO_4$, LiSiCON, $Li_{1.3}Al_{0.3}Ti_{1.7}(PO_4)_3$, $0.5LiTaO_{3+0.5}SrTiO_3$, $Li_{0.34}La_{0.51}TiO_{2.94}$, $LiAlCl_4$, $Li_7SiPO_8$, $Li_9AlSiO_8$, $Li_3PO_4$, $Li_3SP_4$, LiPON, $Li_7La_3Zr_2O_{12}$, $Li_{1.5}Al_{0.5}Ge_{1.5}(PO_4)_3$, $Li_6PS_5Cl$, $Li_5Na_3Nb_2O_{12}$; or a set of polymer: PEO, oligomeric ethylene oxide groups and silicon-based groups distributed in alternating positions between the oligomeric ethylene oxide groups. If this planarizing layer is also used for high thermal conductor, the material for this layer can be selected from a group ceramic, but not limited to, aluminum oxide, aluminum nitride, zirconium dioxide (zirconia), magnesium oxide, yttrium oxide, calcium oxide, cerium (III) oxide and boron nitride. If this planarizing layer is used also as a moisture resistance, the material for this planarizing layer can be selected, but not limited to, from a group of metals, glass, ceramics, mica, silicone resins, asbestos, acrylics, diallyl phthalate, and plastic resins.

In an alternative embodiment of the present invention, the materials used to form intermediary one or more thin film planarizing layers overlying the first electrochemical/electrical active layer(s) within a solid state battery or other solid state device having inert properties to mitigate flaws and to prevent mechanical failures which include but are not limited to prevent an oxygen species, a water species, a nitrogen species, and a carbon dioxide species from diffusing into either the first electrochemical/electrical active layer(s), or to prevent any material comprising the second layer from bonding to, alloying, mixing or forming a composite with the first layer; and comprising, but not limited to:

The choice of deposition method of forming the planarizing layers depends on the types of material needed to be formed, the type of material properties intended to generate, and the type of microstructure of material intended to form. These methods include, but are not limited to, thermal evaporation, phase-change liquid feeder assisted thermal evaporation, e-beam vapor deposition, radio frequency magnetron sputtering, direct current magnetron sputtering, physical vapor deposition (PVD), chemical vapor deposition, low pressure chemical vapor deposition (LPCVD), atomic layer deposition (ALD), direct laser writing (DLW), sputtering, microwave plasma enhanced chemical vapor deposition (MPECVD), pulsed laser deposition (PLD), nanoimprint, ion implantation, laser ablation, spray deposition, spray pyrolysis, spray coating and plasma spraying.

After the deposition of the stacked cells or single layer of cell, the solid-state battery device or subunit can be rapidly heating to a target temperature for at least 60 minutes for burning out or oxidizing certain layer to serve as detaching or smoothing layer between stacked cells or layers.

In an alternative embodiment, one or more planarizing layers are used to fills pinholes and cracks. The thicknesses, orders and selection of these planarizing layers depend on the flaw dimensions, and type of the materials of the proceeding layers. Furthermore, the types of microstructures of these planarizing layers can alter their own material properties. Carefully choosing the proper evaporation methods are necessary because types of evaporation methods, their background gases, and substrates, evaporation sources temperature are closely related to the end product's microstructure of the films. The contact resistance and the residual stress induced during deposition process can be reduced, and the flat surface of planarizing layer provides a foundation for subsequent layers' uniformity in plane dimension within the device, once the crack, pinholes and roughness of preceding layers are flatten by planarizing layers.

In another specific embodiment, present invention provides a method utilizing one or more inert layers overlaying other layers of dissimilar materials to constrain diffusion of species or conduction of electrons, wherein the stacking sequence of said layers is either in a single stack or in repeats one or more times. The inert layer used to prevent diffusion of strong reactive species throughout the layers within the thin film energy storage device or an all solid-state devices. The strong reactive species that the inert layers try to control, include, but not limited to, lithium atoms, lithium ions, protons, sodium ions, and potassium ions, or other ionic species. The inert layers are selected from materials including, but not limited to, polymeric materials, aluminum oxide, and other ceramics, which have ionic diffusion coefficients lower than $1 \times 10^{-17}$ m$^2$/s for the strong reactive species so that the strong reactive species are hardly diffusing through. Another function of inert layer is to prevent conduction of electrons; where the inert layer is selected from materials including, but not limited to, polymeric materials, that the electrons are hardly conducting through these layers. Alternating these inter layers of these two groups of material layers can control both ionic species and electrons.

In another preferred embodiment of present invention, one or more thin film planarizing layers overlaying on the electrical/electrochemical active layer of a thin film energy storage device or an all solid-state device enable devices operation under high temperature, ruggedness, resistance to harsh environments including chemical and physical degradation, and providing electrical isolation. To achieve this aim, several thin-film layers deposited on top each other to form functional unit: a single thin film adhesive layer in continuous physical contact with an non-planar electrical/electrochemical active layer of a solid state electrochemical energy storage device or electronic device; another one or more thermally conductive layers deposited overlaying on proceeding adhesive layer and wired to a heat sink location to transport the heat generated inside the device to outside environment so that a tolerable temperature inside this device is maintained; extra one or more relatively thermally insulated layers deposited overlaying on thermally conductive layers if this device was mounted or installed around high temperature emitter so that the heat from the emitter can be controlled and not be conducted into the device; finally an protective layer deposited upon proceeding thermally conductive layer or thermally insulated layer depending on whether this unit is exposed to the environment or still embedded inside another well temperature controlled device. When this functional unit used to controlled temperature is inside the thin film energy storage device or an all solid-state device, this unit can be sandwiched between two functionally active layers. Otherwise, the protective layer of this functional unit will be facing to external environment.

In another alternative embodiment, present invention provides a method of utilizing one or more thin film planarizing layers overlaying on the electrical/electrochemical active layer of a thin film energy storage device or an all solid-state device enable devices operation under high temperature, ruggedness, resistance to harsh environments including chemical and physical degradation, and providing electrical isolation. To achieve this aim, several thin-film layers sequentially are deposited on top each other to form functional unit, and their orders are:

A. a single thin film adhesive;
B. one or more thermally conductive layers;
C. extra one or more relatively thermally insulated layers;
D. and a protective layer if necessary.

The adhesive layer has total thickness less than 500 Angstroms, and the materials of this adhesive layer are selected from either: a group of elastomers, such as butyl, styrene butadiene, phenolic, polysulfide, silicone, or neoprene; a group of polymer electrolyte, such as metal salts, AX (where A$^+$ is anodic ion and is selected from a group of metals, but not limited to, Li$^+$, Na$^+$, Mg$^{2+}$, etc., and X$^-$ is cathodic ions, but are not limited to, I$^-$, Cl$^-$, Br$^-$, ClO$_4^-$, CF$_3$SO$_3^-$, BF$_4^-$, and AsF$_6^-$), in polymer where polymer is chosen from a group of polymer such as, poly(ethylene oxide) (PEO), polypropylene oxide) (PPO), poly(ethylene glycol) (PEG), poly(vinylidene fluoride) (PVdF), poly(acrylonitrile) (PAN), poly(methyl methacrylate) (PMMA), poly (vinylidene fluoride-hexafluoroproplene) (PVdF-co-HFP); a group of plastic polymers, such as cyanoacrylate, polyester, epoxy, phenolic, polymide, polyvinylacetate, polyvinyl acetal, polyamide, acrylic; a group of ceramic or glass if the temperature range of elastomer and plastic polymers not suitable, such as zirconium oxide, ruthenium oxide, rhodium oxide, iridium oxide, osmium oxide, zirconium boride, titanium nitride, tungsten carbide, tantalum nitride, tungsten nitride, titanium boride, tantalum boride, tungsten boride, lead-alkali borosilicate, or from a group of metal from zirconium, titanium, rhodium, iridium, osmium, or palladium. The one or more thermally conductive layers are deposited overlaying on the proceeding adhesive layer, and these layers have total thickness less than 1 micron. The types of materials for conducting heat out this device can be selected either from a group of ceramic, such as aluminum oxide, aluminum nitride, boron nitride, zinc oxide, indium tin oxide and mica; or a group of metal, such as aluminum, silver copper, zinc, indium, tin. Next, extra one or more relative thermally insulated intermediate layers are deposited overlaying on thermally conductive layer as high temperature emitter devices are in current device's neighborhood so that the high temperature will not be emitted into current device. These relative thermally insulated intermediate layers have thicknesses less than 1 micron when needed. The types of materials that can be used to insulating temperature can be selected either from a group of ceramic, such as soda-lime, mica, and borosilicate; from a group of metal, such as aluminum, silver copper, zinc, indium, and tin; or from a group of polymer, such as ethylene (E), polyethylene, propylene (P), vinyl fluoride, vinylidene fluoride, tetrafluoroethylene, hexafluoropropylene, perfluoropropylvinylether, perfluoromethylvinylether, chlorotrifluoroethylene, polycarbonate, polyetherimide (PEI), polymide, polystyrene, epoxy, and phenolic materials.

In another specific embodiment of the present invention, two different physical properties layered electrolyte in a thin film electrochemical energy storage system is used to provide proper function as electrolyte and to reduce fabrication time. The candidates for these controlled physical properties includes, but not limited to, mass density, crystal structure, ionic conductivity, ionic diffusivity, electronic conductivity, dielectric constant, sheet resistance, contact resistance, mechanical strength, mechanical hardness, thermal expansion coefficient, and concentration expansion coefficient. The first layer of this two-layered electrolyte is thinner, tolerable for high temperature, and stiff to prevent dendrite growing and electrically shortening. The second layer of this two-layered electrolyte is thicker and with lower ionic diffusivity for strong reactive species, and one or more of the physical properties would be tailored to have certain properties so that it could use to mitigate issues related to either the diffusion, electrical conduction, mechanical stress, inert or less diffusive for external species or strong reactive species so that the cycle life of the overall system can be improved.

In another preferred embodiment, present invention provides a method of using plurality of bi-layers in a thin film electrochemical system or other solid-state devices to prevent diffusion of Li or other active species from the solid-state device and to protect thin film electrochemical system or solid-state device from service environments that can react with the active materials such as oxygen, moisture or nitrogen. In this bi-layered functional unit, the first layer is a polymer layer, which is inert and will not react with the active material. This polymer layer has two functions: preventing diffusion of the active material ionic species, and serving as planarizing layer for subsequent layer. The second layer of this bi-layered functional unit is comprised of inorganic materials. The second layer serves as a barrier to the species that can diffuse from the environment, such as oxygen, nitrogen, and moisture. Combination of this bi-layered functional unit can prevent the active species of this device reacting with external species and prevent the useful capacity or energy loss due to reaction of active species and external species.

Figure 1B:
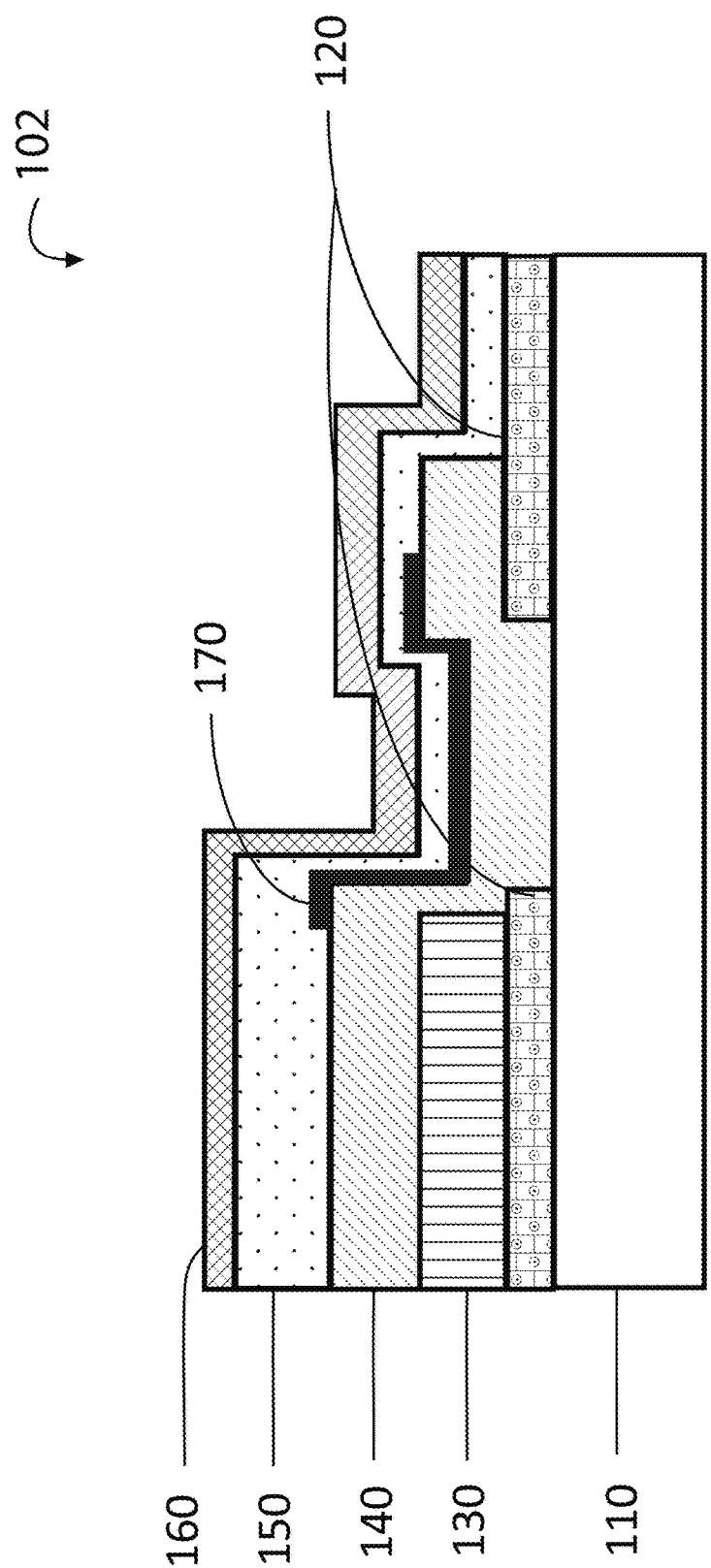
FIG. 1B is a simplified cross-sectional view of a modified thin film electrochemical cell with an additional diffusion barrier layer over the bridge region between the electrolyte and the anode layers according to an embodiment of present invention.

In an example, we demonstrate the effect of a diffusion barrier interlayer within a thin film electrochemical system, which includes a substrate 110, a current collector 120, a cathode 130, an electrolyte 140, an anode 150, and an encapsulation layer 160 (shown in FIGS. 1A and 1B). FIG. 1A is a simplified cross-sectional view of thin film electrochemical energy storage cell according to an embodiment of present invention. FIG. 1A illustrates simplified cross-sectional views of electrochemical cell, 101, near the "bridge" region between cathode active area and anode current collector, where the lithium ion from anode is diffused through and forming the conductive pathway perpendicular to the substrate, across the anode and the anode current collector.

FIG. 1B is a simplified cross-sectional view of a modified thin film electrochemical cell, 102, with an additional diffusion barrier layer over the bridge region between the electrolyte and the anode layers according to an embodiment of present invention. FIG. 1B illustrates a cross-sectional view of a modified electrochemical cell with an additional diffusion barrier layer 170 over the bridge region between the electrolyte and the anode layers to prevent anode species (i.e. lithium ion) from diffusing into the substrate or other under layer materials.

Figure 2A:
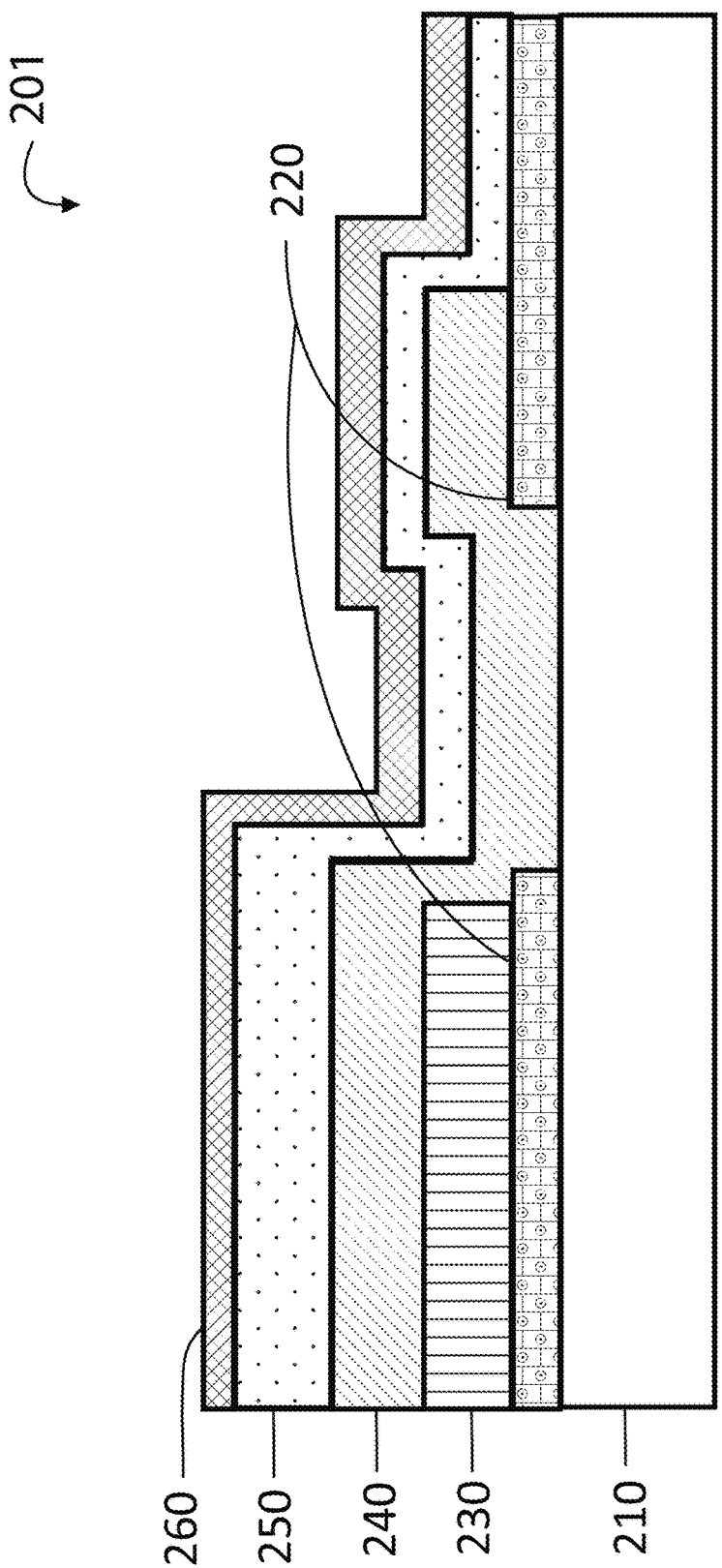
FIG. 2A is a simplified cross-sectional view of a thin film electrochemical energy storage cell according to an embodiment of the present invention.

FIG. 2A is a simplified cross-sectional view of a thin film electrochemical energy storage cell according to an embodiment of the present invention. FIG. 2A illustrates an example of the cell construction without an anode barrier layer, showing a schematic cell structure similar to that shown in FIG. 1A. The cell 201 can include a substrate 210, a current collector 220, a cathode 230, an electrolyte 240, an anode 250, and an encapsulation layer 160. Those of ordinary skill in the art will recognize other variations, modifications, and alternatives.

Figure 2B:
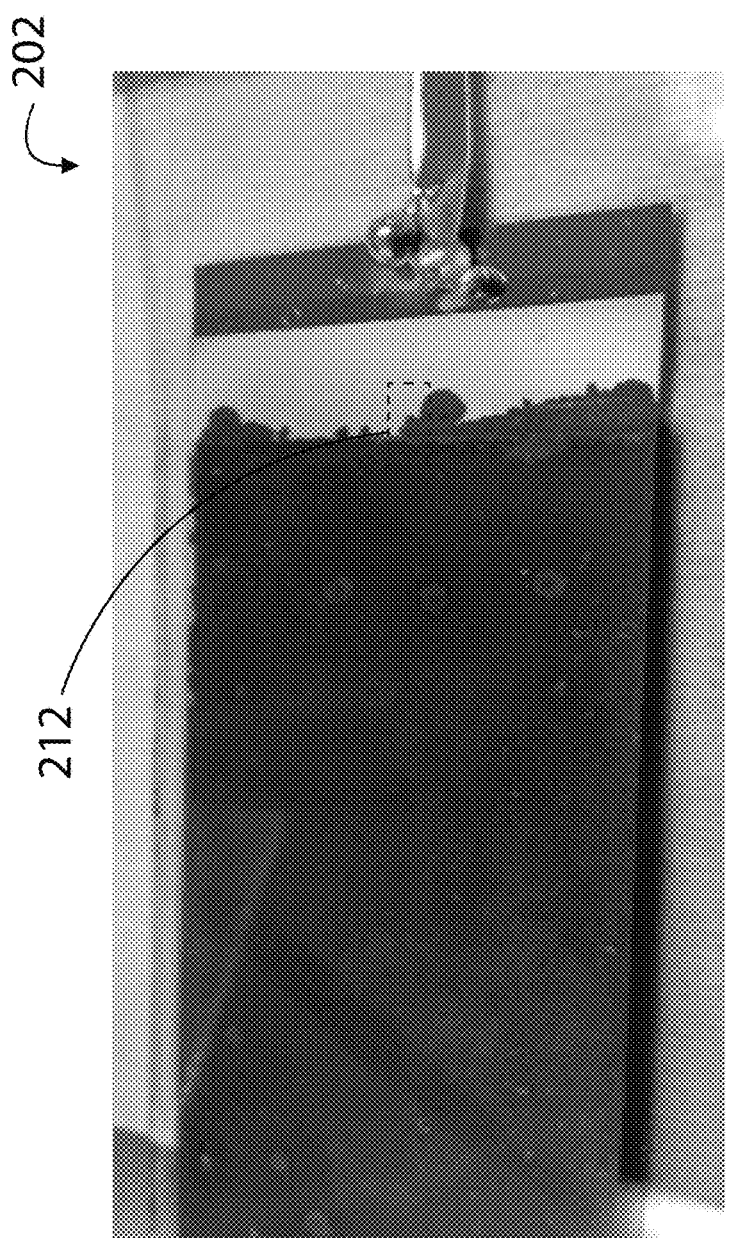
FIG. 2B is a photograph of a thin film electrochemical energy storage cell according to an embodiment of the present invention.

FIG. 2B is a photograph of a thin film electrochemical energy storage cell according to an embodiment of the present invention. The image 202 shows the thin film coupled to an electrical connection. Dotted portion 212 shows a region of focus that for the following figure. This image can be of a cell similar to that shown in FIG. 2A.

Figure 2C:
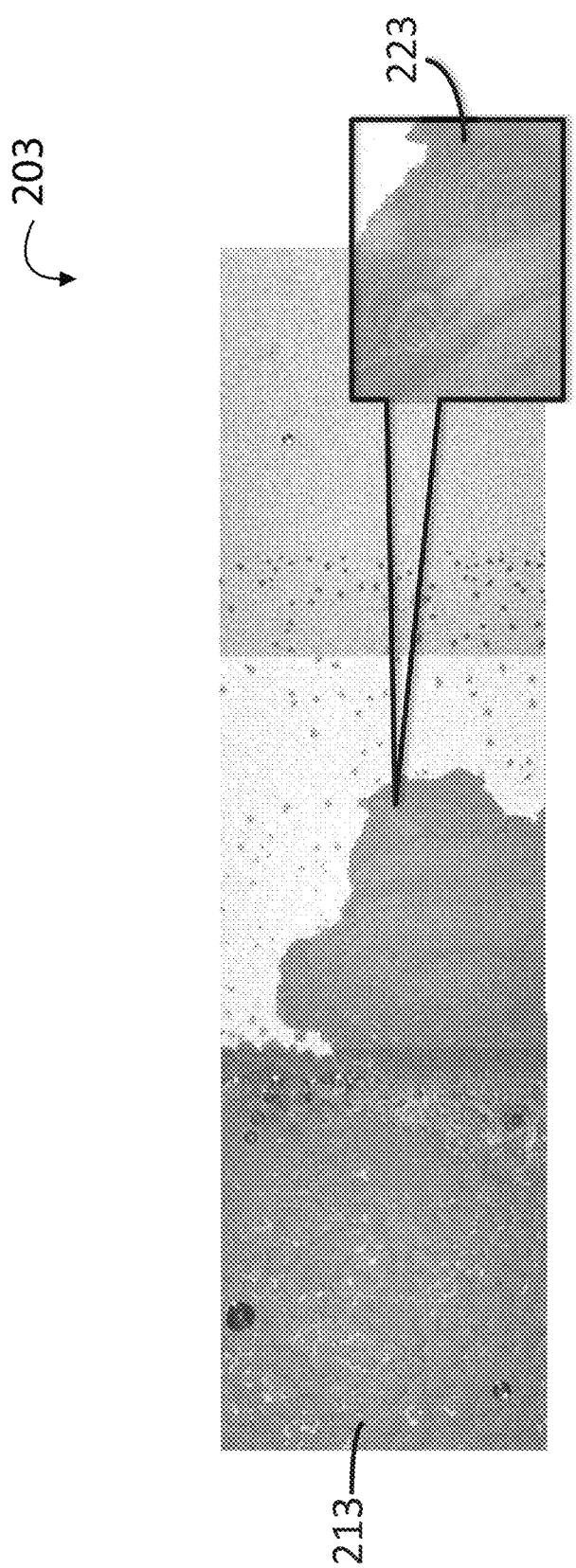
FIG. 2C is a microscopic graph view of the same area as the schematic drawing shown in FIG. 2A according to an embodiment of present invention.

FIG. 2C is a microscopic graph view of the same area as the schematic drawing shown in FIG. 2A according to an embodiment of present invention. This image 203 can also be a close up view of the region of focus 212 shown in FIG. 2B. FIG. 2C shows a growth of the lithium corrosion layer 213 in the bridge region wherein corroded lithium is shown as dark layered pattern in the close-up view 223.

Figure 2D:
FIGS. 2D and 2E are microscopic graph views of the same area as the schematic drawing of FIG. 2A in which a light is shone from the bottom of the specimen according to embodiments of the present invention.
Figure 2E:
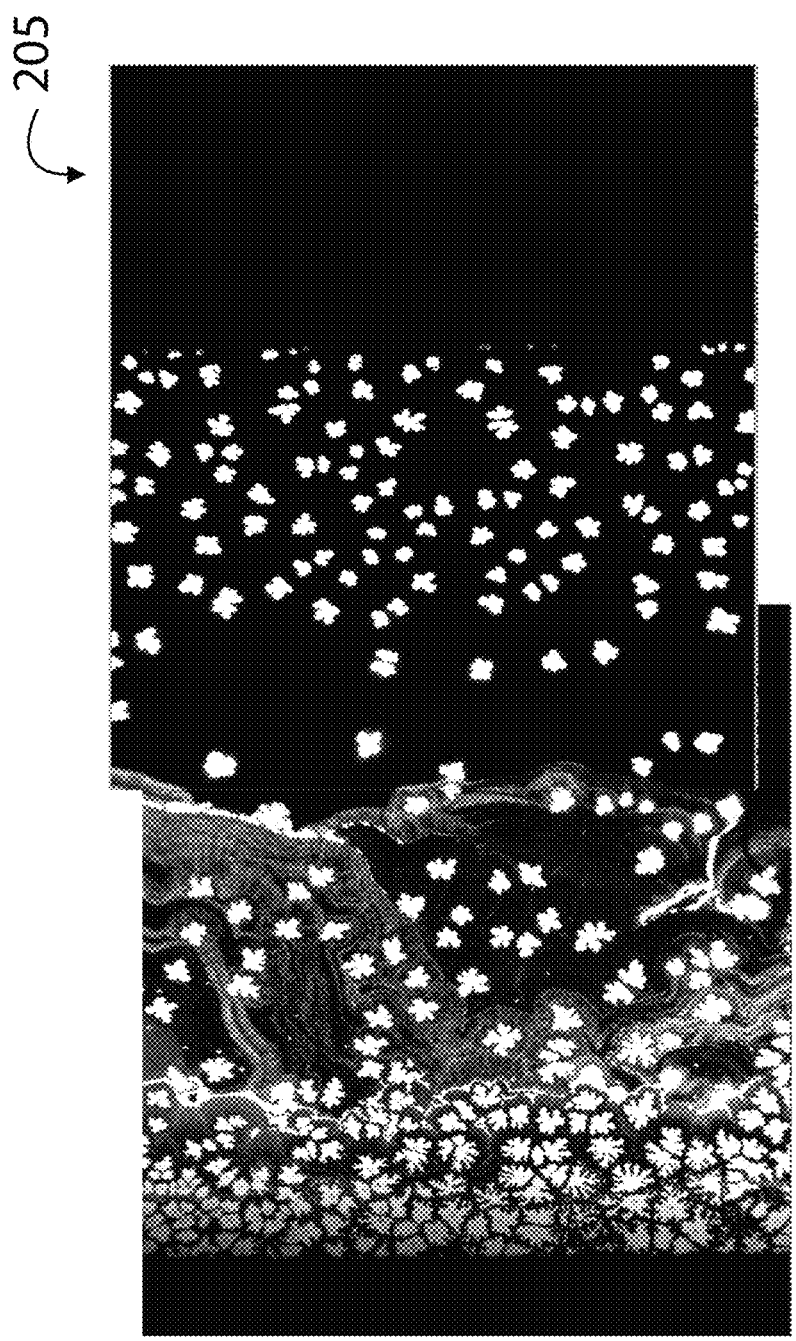

FIGS. 2D and 2E are microscopic graph views of the same area as the schematic drawing of FIG. 2A in which a light is shone from the bottom of the specimen according to embodiments of the present invention. FIGS. 2D and 2E show similar microscopic images 204, 205 with a light source placed on the back of the specimen to show the layered patterns and the dots are translucent where lithium anode is missing and corroded to become lithium oxides.

Figure 2F:
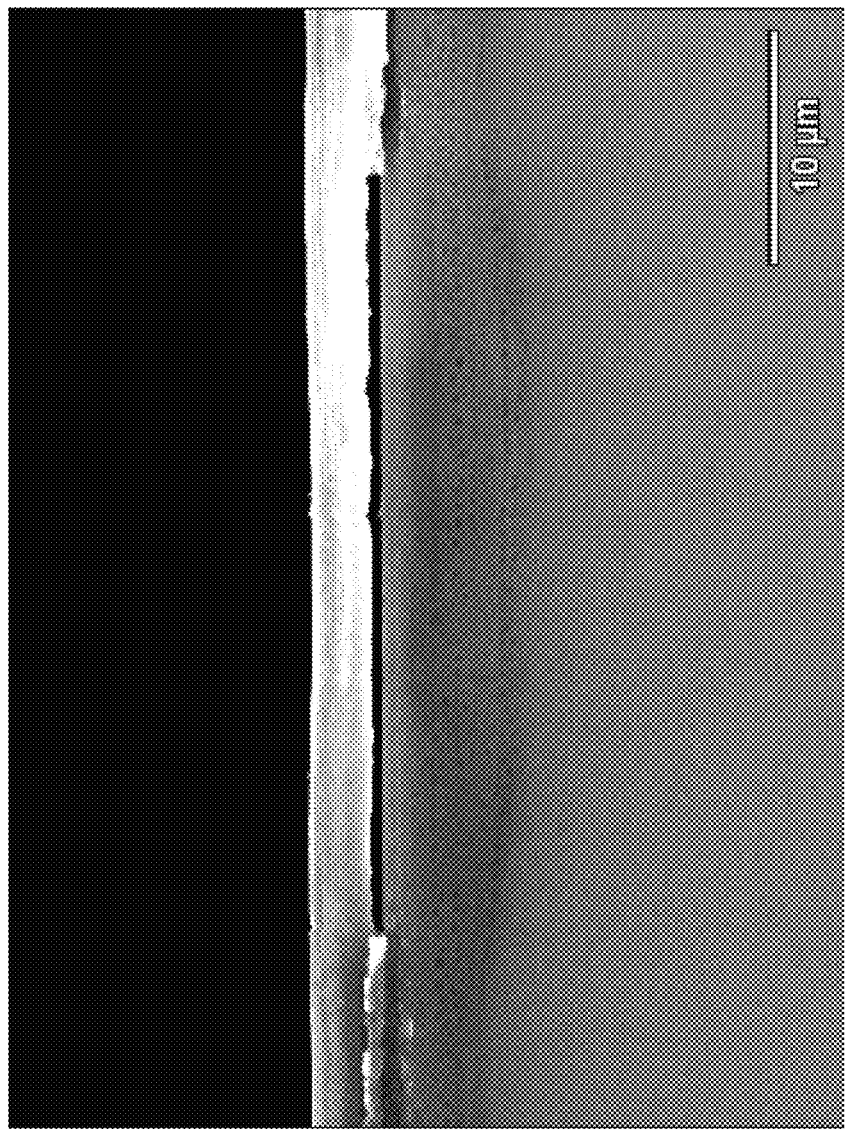
FIG. 2F is a scanning electron microscope graph of the "bridge" region shown in FIG. 2C according to an embodiment of present invention.

FIG. 2F is a scanning electron microscope graph of the "bridge" region shown in FIG. 2C according to an embodiment of present invention. FIG. 2F shows an SEM image 206 of the cross-section of the bridge region where the anode layer is diffused into the substrate to leave a void between the electrolyte and the encapsulation layer.

Figure 3A:
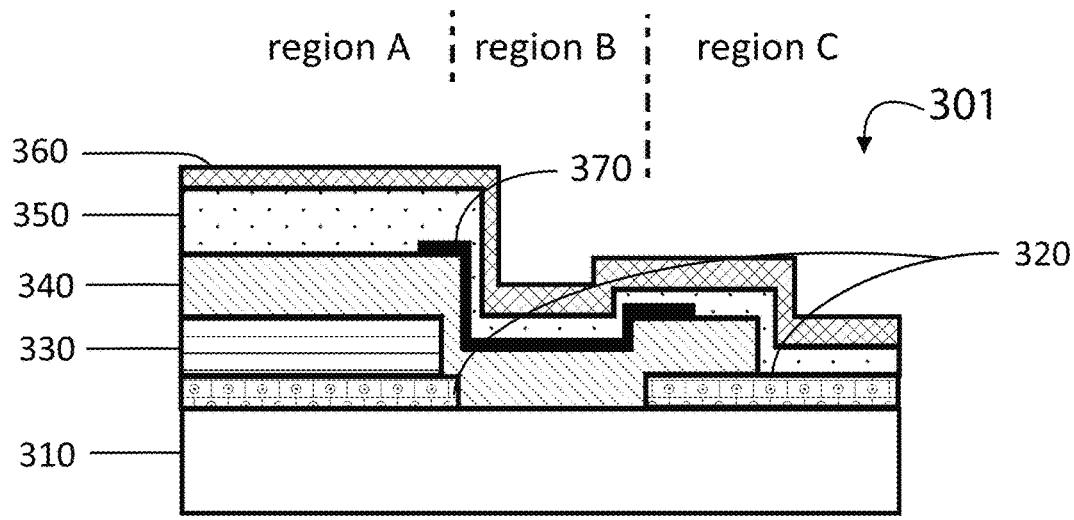
FIG. 3A is a simplified cross-sectional view of the thin film electrochemical energy storage cell having three regions with an additional diffusion barrier layer deposited over a bridge region according to an embodiment of present invention.

FIG. 3A is a simplified cross-sectional view of the thin film electrochemical energy storage cell having three regions with an additional diffusion barrier layer deposited over a bridge region according to an embodiment of present invention. This cell 301 is similar to the cell shown in FIG. 1B, which includes a substrate 310, a current collector 320, a cathode 330, an electrolyte 340, an anode 350, an encapsulation layer 360, and a barrier layer 370. FIG. 3A is a modified cell structure with an additional diffusion barrier layer deposited over the bridge region (region B) between cell active area (region A) and current collector (region C).

Figure 3B:
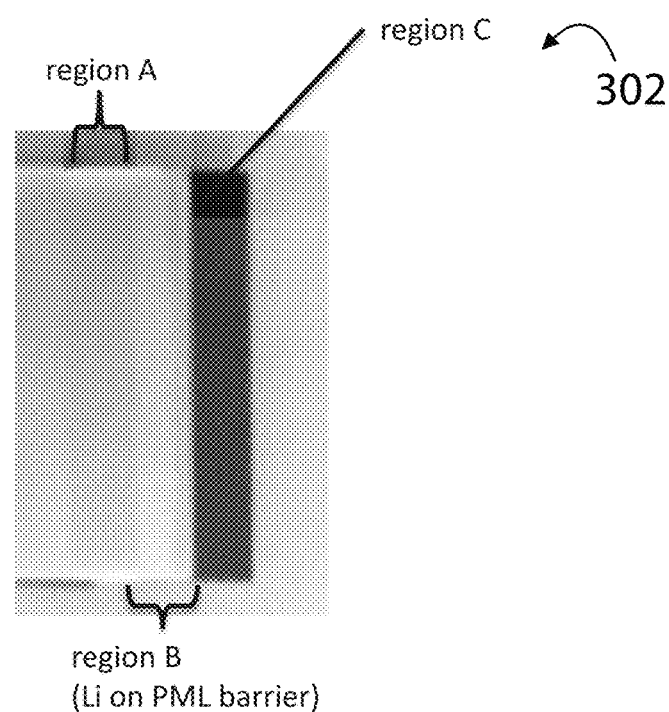
FIG. 3B is a graph of showing a pristine anode surface across all three regions as shown in FIG. 3A according to an embodiment of the present invention.

FIG. 3B the picture below shows pristine anode surface across all three regions as shown in FIG. 3A according to an embodiment of the present invention. Image 302 shows the cell with the protection of the barrier layer preventing the reaction between the lithium and the substrate material. Region A corresponds to the cell active area, region B corresponds to the bridge region (Li on PML barrier), and region C corresponds to the current collector of the cell shown previously.

Figure 4A:
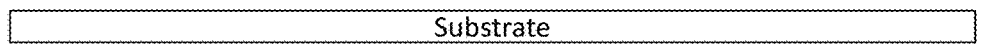
FIGS. 4A-4F illustrate simplified cross-sectional views of each process step showing an electrochemical cell layer formed according to an embodiment of the present invention.
Figure 4B:
Figure 4C:
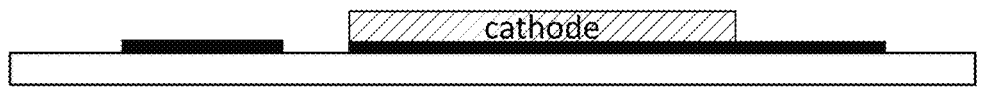
Figure 4D:
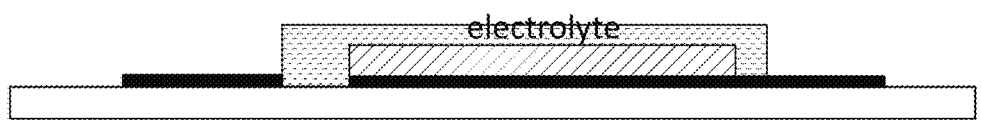
Figure 4E:
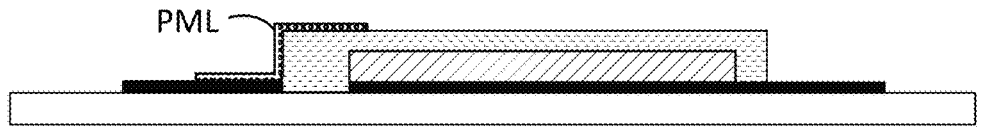
Figure 4F:
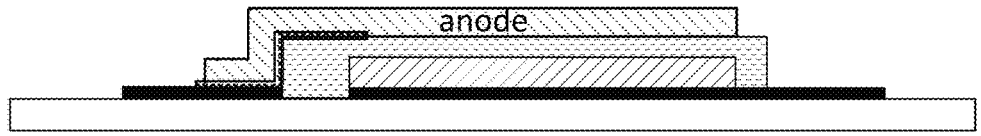

FIGS. 4A-4F illustrate simplified cross-sectional views of each process step showing an electrochemical cell layer formed according to an embodiment of the present invention. A substrate is provided in FIG. 4A. In a first step, the anode and the cathode current collectors (ACC and CCC) are deposited on the substrate (FIG. 4B); in a second step, cathode material is deposited on the cathode current collector (FIG. 4C); in a third step, the material of the electrolyte is deposited over the cathode (FIG. 4D); in a fourth step, the diffusion barrier is deposited over the bridge region across the electrolyte between the active area where the cathode material is deposited and the anode current collector (FIG. 4E); in a fifth step, anode material is deposited over the active area, the bridge region, and a portion of the anode current collector (FIG. 4F).

In another preferred embodiment, present invention provides a method using multiple thin film layers as diffusing layers in a thin film electrochemical system or other thin film devices, such as displays, solar cells, electrochromic glasses, etc., to mitigate process-intrinsic and/or environmental stress by using multilayer materials. One of the diffusing layers is a disappearing layer, which uses highly diffusive material so that this layer will be evacuated as the species diffused through neighboring layers, and the vacated space will be served as a stress discontinuity so that overall stresses inside the thin film electrochemical system or thin film devices will be reduced and prolong its service life. A second layer of the diffusing layers serves as passage layer, which utilizes material having high ionic conductivity for highly diffusive species in the disappearing layer. The third layer of the diffusing layers serves as overlaying layer and as a diffusion host, which will react with highly diffusive species in the disappearance layer to form alloy, and to accommodate the diffusive species for future usage. This overlaying layer will become a diffusion host for highly diffusive species after the disappearance layer vacated and stored in this overlaying layer, the needs of highly diffusive species will be provided from this diffusion host layer.

In an alternative preferred embodiment, present invention provides a method using multiple thin film layers as diffusing layers. These multiple thin-film layers comprises a disappearing layer, a passage layer, and a diffusing layer (or a host layer), in sequence. The disappearing layer serves as diffusion agent. This disappearing layer is deposited from highly diffusive species including, but not limited to, a group of single elements, such as lithium atoms, lithium ions, protons, sodium ions, and potassium ions, or other ionic species, a group of lithium alloys, including but not limited to lithium magnesium alloy, lithium aluminum alloy, lithium tin alloy, lithium tin aluminum alloy. The passage layer as diffusion medium is comprised of an ionically conductive material and can be selected from, but not limited to, a group of glassy ionic conductive materials such as lithiated oxynitride phosphorus, lithium lanthanum zirconium oxide, lithium lanthanum titanium oxide, lithium sodium niobium oxide, lithium aluminum silicon oxide, lithium phosphate, lithium thiophosphate, lithium aluminum germanium phosphate, lithium aluminum titanium phosphate, LISICON (lithium super ionic conductor, generally described by $Li_xM_{1-y}M'_yO_4$ (M=Si, Ge, and M'=P, Al, Zn, Ga, Sb)), thio-LISICON (lithium super ionic conductor, generally described by $Li_xM_{1-y}M'_yS_4$ (M=Si, Ge, and M'=P, Al, Zn, Ga, Sb)), lithium ion conducting argyrodites ($Li_6PS_5X$ (X=Cl, Br, I)), with ionic conductivity ranging from $10^{-5}$ to $10^{-1}$ S/m; a group of ionic conductive polymers such as poly(ethylene oxide) (PEO).

In an embodiment, the overlaying layer serves as diffusion host once the highly diffusive species diffused from the disappearing layer and react or intercalated into this layer. The candidates for this overlaying layer or diffusion host layer can be selected from, but not limited to, a group of metals such as aluminum, silver copper, zinc, indium, tin; a group of amorphous or crystalline lithiated or non-lithiated transition metal oxide and lithiated transition metal phosphate, wherein the metal is in Groups 3 to 12 in the periodic table, including but not limited to lithium manganese oxide, lithium nickel oxide, lithium cobalt oxide, lithium nickel-cobalt-manganese oxide, lithium nickel-cobalt-aluminum oxide, lithium copper-manganese oxide, lithium iron-manganese oxide, lithium nickel-manganese oxide, lithium cobalt-manganese oxide, lithium nickel-manganese oxide, lithium aluminum-cobalt oxide, lithium iron phosphate, lithium manganese phosphate, lithium nickel phosphate, lithium cobalt phosphate, vanadium oxide, magnesium oxide, sodium oxide, sulfur, metal (Mg, La) doped lithium metal oxides, such as magnesium doped lithium nickel oxide, lanthanum doped lithium manganese oxide, lanthanum doped lithium cobalt oxide.

In an example, when thin film electrochemical cells are stacked together, a set of electrochemical cells should be connected or isolated to form serial or parallel connections to establish desired voltages or capacities for a specific application. In this example, three lithium batteries are stacked to form three cells in parallel with an electrically isolating interlayer between stacks. Material types such as ceramics or polymers can be used as an isolating interlayer for stacked electrochemical cells with parallel connections. This example compares the effect of planarization of these two material types.

In an example, the present invention can provide a method of fabricating a multilayered thin film solid state battery device. The steps involved in this method include, but are not limited to, the following: providing a substrate member, forming a barrier material, forming a first electrode material, forming a thickness of cathode material, forming an electrolyte, forming an anode material, forming a second electrode material, and transferring a thin film solid state battery device.

In an example, the substrate member can include a surface region and can be characterized by a melting point temperature. The barrier material can be formed overlying the surface region of the substrate member. This barrier material can include a polymer material and can be configured to substantially block a migration of an active metal species to the substrate member. Also, the barrier material can be characterized by a barrier degrading temperature. The first electrode material can be formed overlying the surface region as well.

In a specific example, the barrier material includes a polymer material. This polymer material can have a thickness ranging from 0.001 µm to 1 µm. This thickness of polymer material can be configured to compensate a strain between the electrode member and the surface region. Also, the temperature is less than 900 Degrees Celsius.

In an example, the thickness of cathode material can have an amorphous characteristic. The formation of this cathode material can be executed while maintaining a temperature ranging from about −40 Degrees Celsius to no greater than 900 Degrees Celsius. Also, the formation of the cathode material can be such that a spatial volume is characterized by an external border region of the cathode material, the thickness of cathode material is characterized by an effective diffusivity having a value ranging from 1.E-18 $m^2$/s to 1.E-4 $m^2$/s and the cathode material is characterized by a void region being 0.001% to 80% of the spatial volume.

In an example, the electrolyte can be configured overlying the cathode material. The anode material can be formed overlying the electrolyte, and the second electrode material can be formed overlying the anode material. The method can then involve transferring the resulting thin film solid state battery device characterized by an energy density ranging from 50 Watt-hour/liter to 3000 Watt-hour/liter.

In an example, the value of intrinsic stresses distribution for a stacked electrochemical cells setup is unknown. Selection of the proper intermediate layer between layer 1 and layer 2 to reduce the stress is critical to construct a long cycle life battery. This example illustrates the effect of intermediate layer's modulus on stress distribution of stacked electrochemical cells by computer simulation.

Figure 5A:
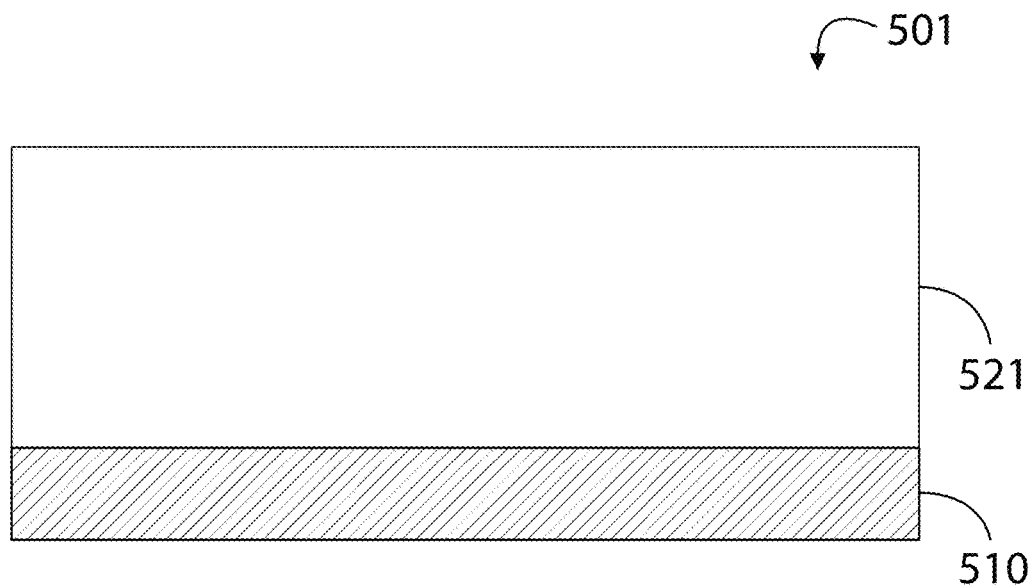
FIG. 5A is a simplified cross-sectional view of an illustration of a cathode material according to an embodiment of the present invention.

FIG. 5A is a simplified cross-sectional view of an illustration of a cathode material 501 according to an embodiment of the present invention. As shown, the first cathode material 521 overlying the second cathode material 510 has a smooth and uniform profile.

Figure 5B:
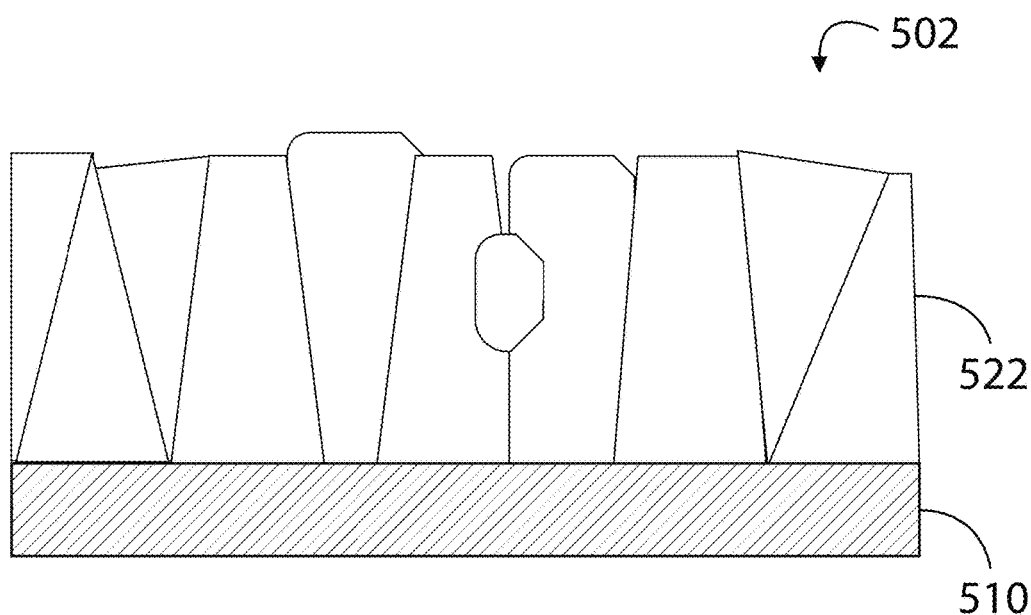
FIG. 5B is a simplified cross-sectional view of an illustration of an amorphous cathode material according to an embodiment of the present invention.

FIG. 5B is a simplified cross-sectional view of an illustration of an amorphous cathode material 502 according to an embodiment of the present invention. As shown, the first thickness of amorphous cathode material 522 overlying the second thickness of cathode material 510 has a rough and irregular profile.

In a specific example, the thickness of cathode material can include a first thickness of amorphous material and a second thickness of material. The first thickness of cathode material can be greater than the second thickness, and the first thickness of amorphous material can be different in structure than the second thickness of material. The cathode material can also include a surface morphology. In a specific example, the effective diffusivity includes a first diffusivity of the first thickness and a second diffusivity of the second thickness.

In a specific example, the cathode material includes a lithium species, the lithium species being selected from at least one of LiSON, $Li_xLa_{1-x}ZrO_3$, $Li_xLa_{1-x}TiO_3$, LiAlGePO$_4$, LiAlTiPO$_4$, LiSiCON, $Li_{1.3}Al_{0.3}Ti_{1.7}(PO_4)_3$, 0.5LiTaO$_{3+0.5}$SrTiO$_3$, $Li_{0.34}La_{0.51}TiO_{2.94}$, LiAlCl$_4$, Li$_7$SiPO$_8$, Li$_9$AlSiO$_8$, Li$_3$PO$_4$, Li$_3$SP$_4$, LiPON, $Li_7La_3Zr_2O_{12}$, $Li_{1.5}Al_{0.5}Ge_{1.5}(PO_4)_3$, Li$_6$PS$_5$Cl, or $Li_5Na_3Nb_2O_{12}$. The cathode material can be characterized by a conductivity ranging from 1.E-12 S/m to 1.E4 S/m, by a C rate ranging from C/100 to 100 C, by an XRD peak to total ratio ranging from 0% to 50% crystallinity, and by an average crystallite size ranging from 0.1 nm to 100 nm configured in a spatial region.

Figure 6:
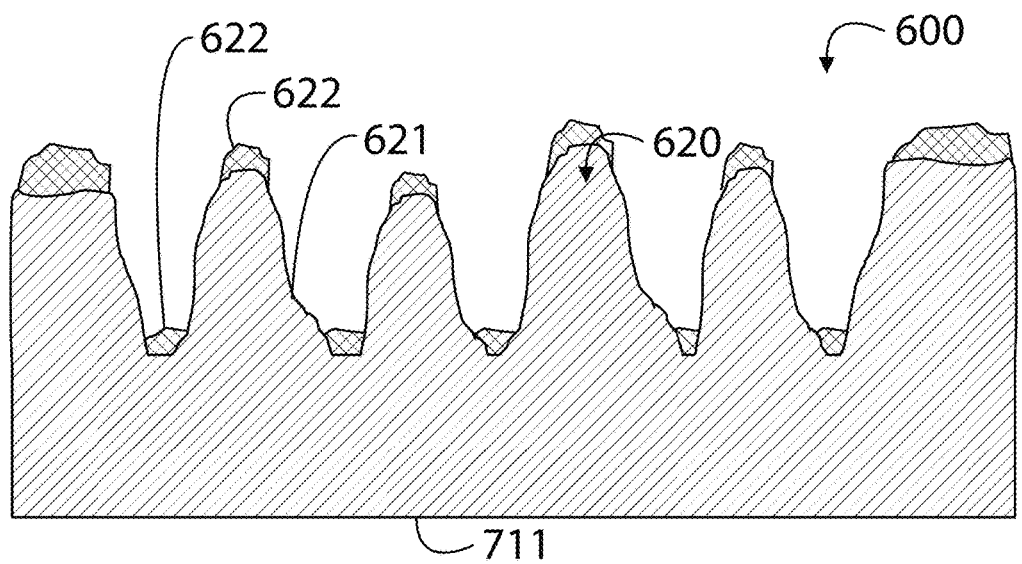
FIG. 6 is a simplified cross-sectional view of an illustration of a cathode material according to an embodiment of the present invention.

FIG. 6 is a simplified cross-sectional view of an illustration of a cathode material 600 according to an embodiment of the present invention. In a specific example, the thickness of cathode material can include a plurality of pillar-like structures 620, each of which extends along a direction of the thickness 610, and substantially normal to a plane of the thickness of material and the surface region of the substrate. Each of the pillar structure can have a base region 621 and an upper region 622. Each of the pillar structures 620 includes a plurality of particle-like structures, which can be configured within each of the pillar structures. Each pair of pillar structures can also have a plurality of irregularly-shaped polyhedral structures provided between the pair of pillar structures. Furthermore, each of the pillar-like structures can include nanotube structures, each of which can be substantially arranged in a direction normal to an upper surface region and a lower surface region of the cathode material.

Figure 7:
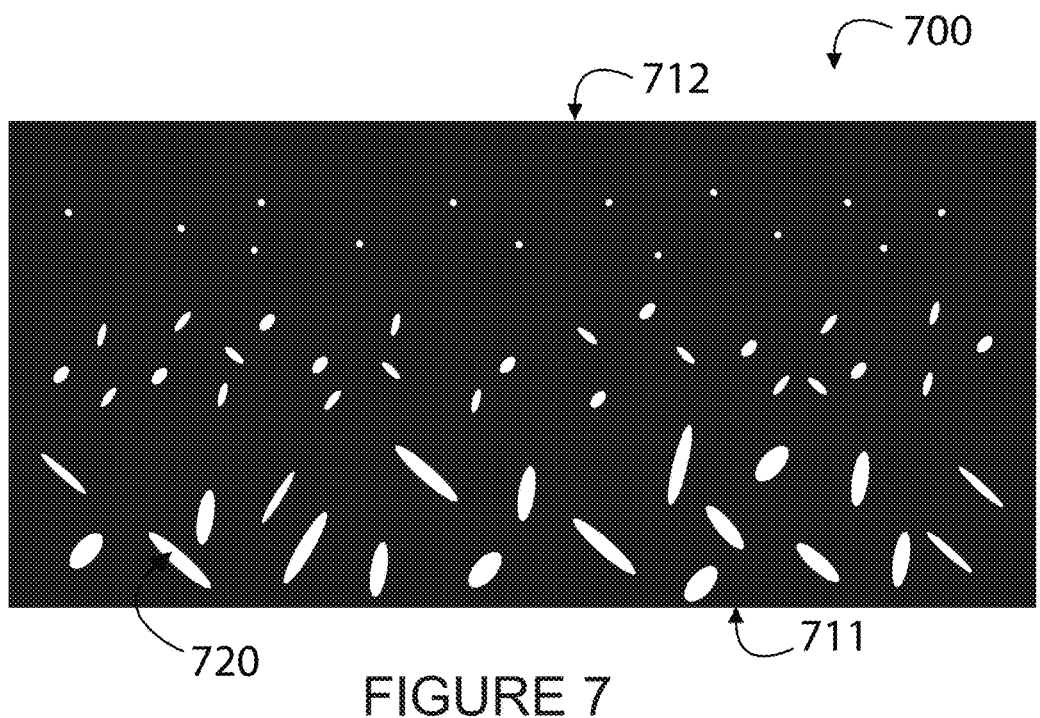
FIG. 7 is a simplified cross-sectional view of an illustration of a cathode material according to an embodiment of the present invention.

FIG. 7 is a simplified cross-sectional view of an illustration of a cathode material 700 according to an embodiment of the present invention. In a specific example, the cathode material includes a plurality of discontinuities 720 generally arranged in a direction from a first face 711 of the cathode material to a second face 712 of the cathode material. The first face 711 can be a lower surface region and the second face 712 can be an upper surface region of the cathode material, as shown in FIG. 7.

Figures 8, 9:
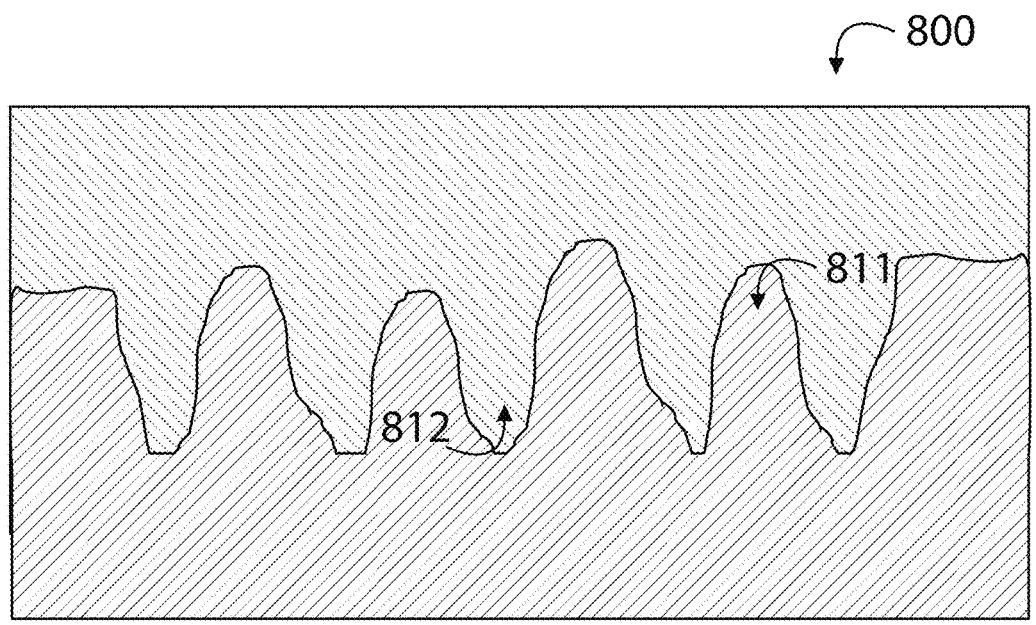
FIG. 8 is a simplified cross-sectional view of an illustration of a cathode material according to an embodiment of the present invention.
FIG. 9 is a table illustrating cathode characteristics for various battery devices in examples according to the present invention.

FIG. 8 is a simplified cross-sectional view of an illustration of a cathode material 800 according to an embodiment of the present invention. In a specific example, the formation of the cathode material can include forming a plurality of first cone structures 811 and a plurality of second cone structures 812 such that the plurality of first cone structures 811 is inter-digitated with the plurality of the second cone structures 812.

FIG. 9 is a table illustrating cathode characteristics for various battery devices in examples according to the present invention. As shown, the table provides characteristics of four types of cathode materials: LiCoO$_2$, LiMn$_2$O$_4$, LiFePO$_4$, and LiV$_2$O$_5$.

Figure 10:
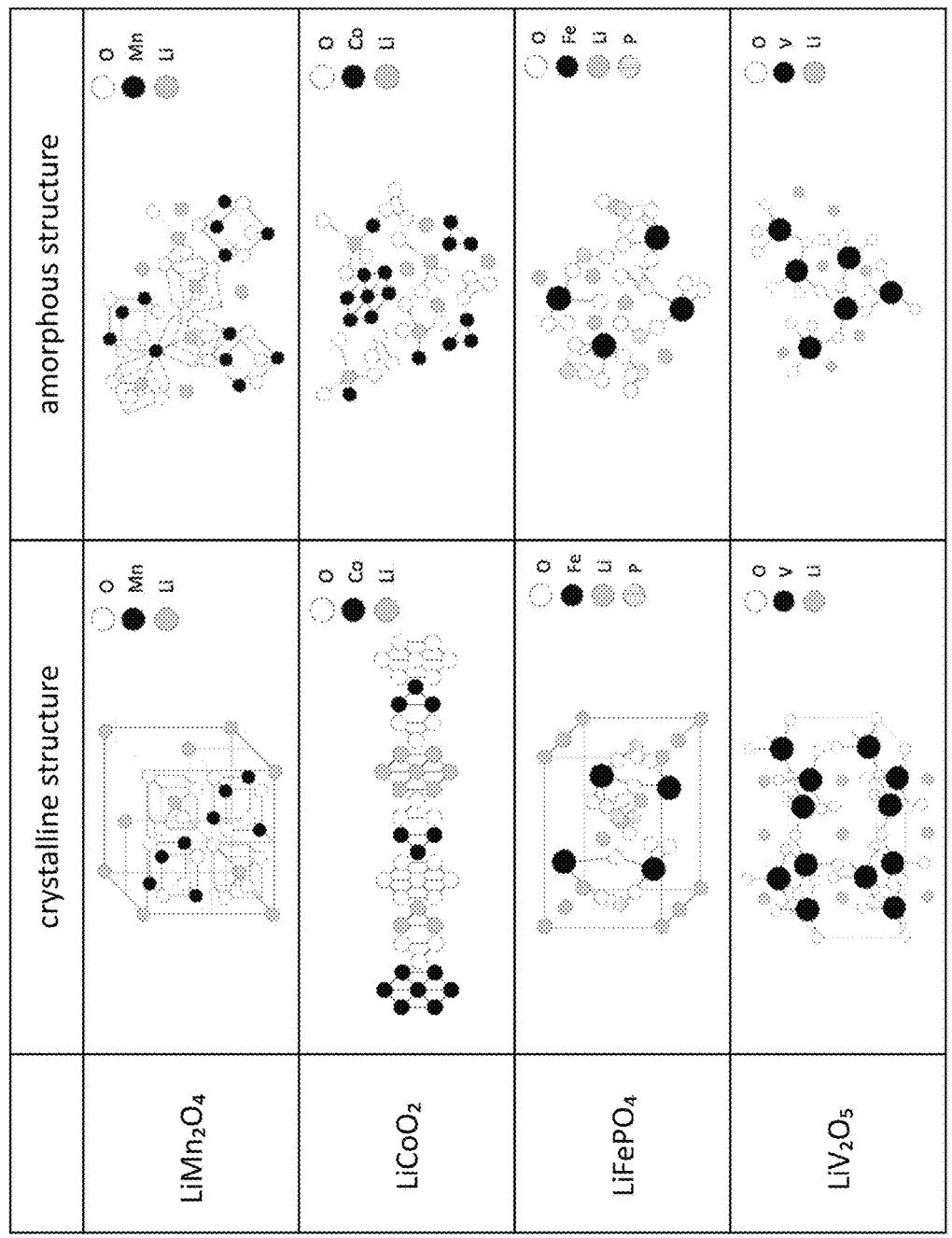
FIG. 10 is a table illustrating a crystalline and amorphous structure for various lithium bearing species for cathode devices according to examples of the present invention.

FIG. 10 is a table illustrating a crystalline and amorphous structure for various lithium bearing species for cathode devices according to examples of the present invention. As shown, the table provides the corresponding crystalline and amorphous structures for the same four types of cathode materials as described in FIG. 9. Each of these lithium bearing species (LiCoO$_2$, LiMn$_2$O$_4$, LiFePO$_4$, and LiV$_2$O$_5$) includes a color-coded key showing the related molecules.

Figure 11:
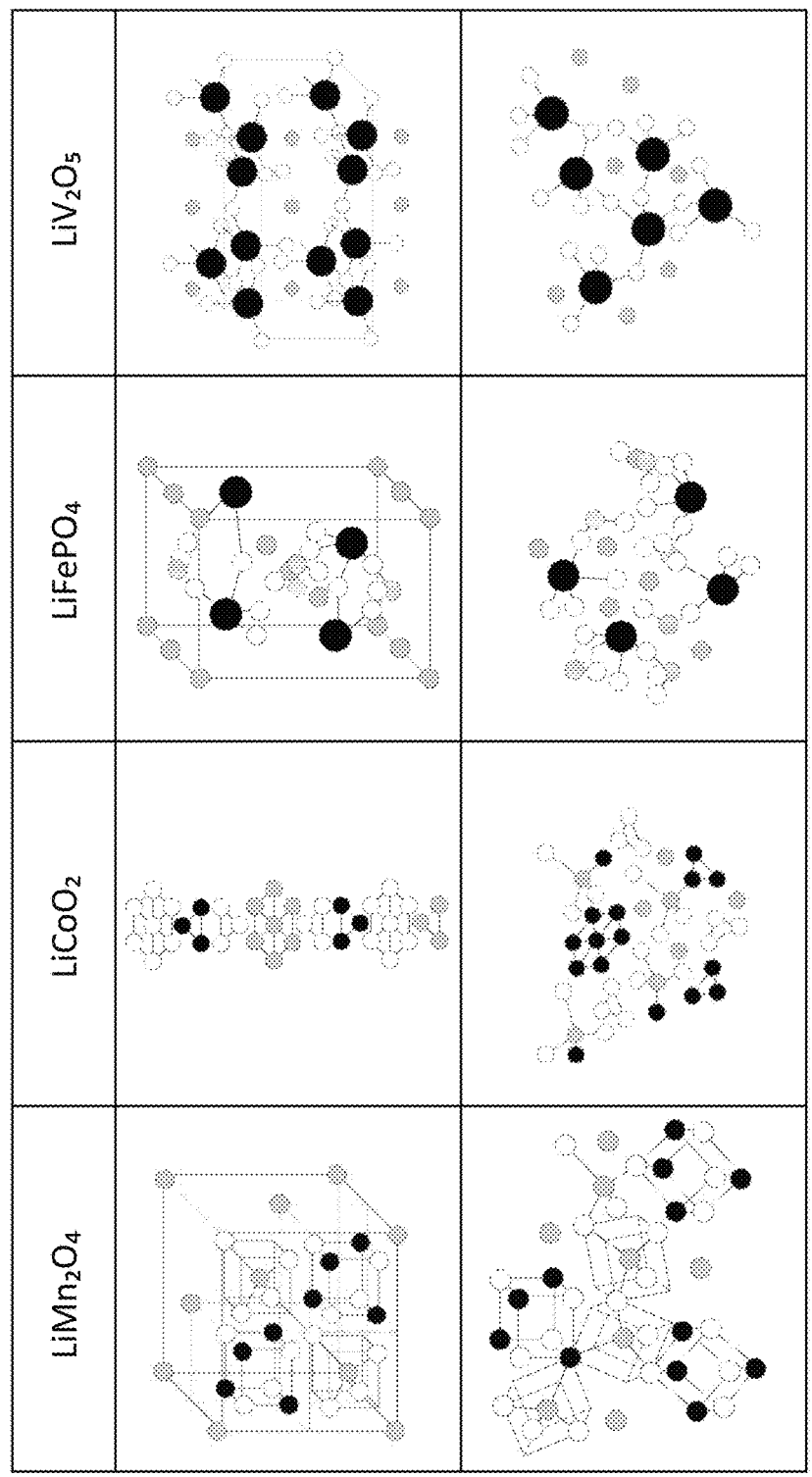
FIG. 11 is a table illustrating a crystalline and amorphous structure for various lithium bearing species for cathode devices according to other examples of the present invention.

FIG. 11 is a table illustrating a crystalline and amorphous structure for various lithium bearing species for cathode devices according to other examples of the present invention. This table shows the same lithium bearing species with the crystalline and amorphous structures configured in columns.

Figure 12:
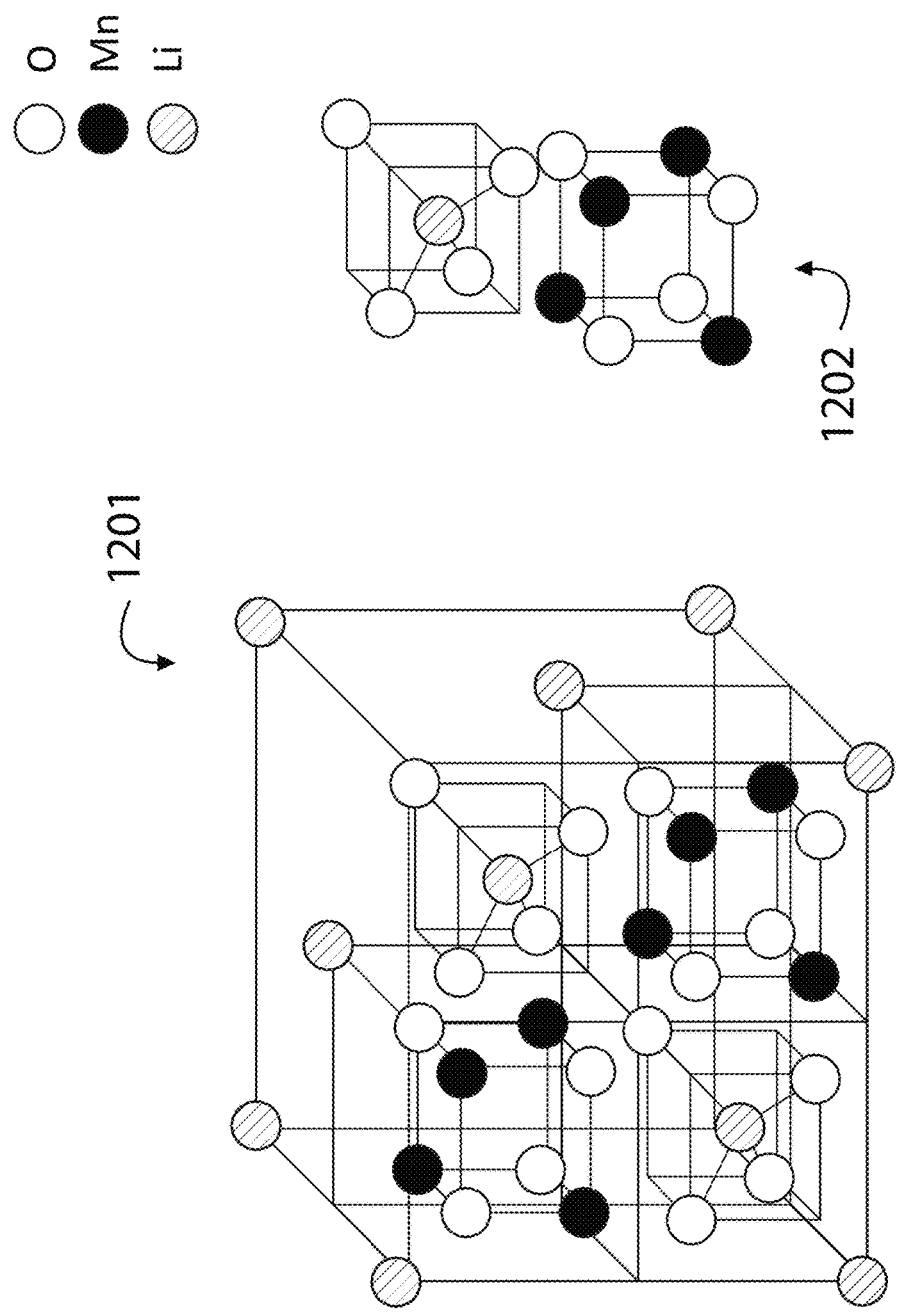
Figure 14:
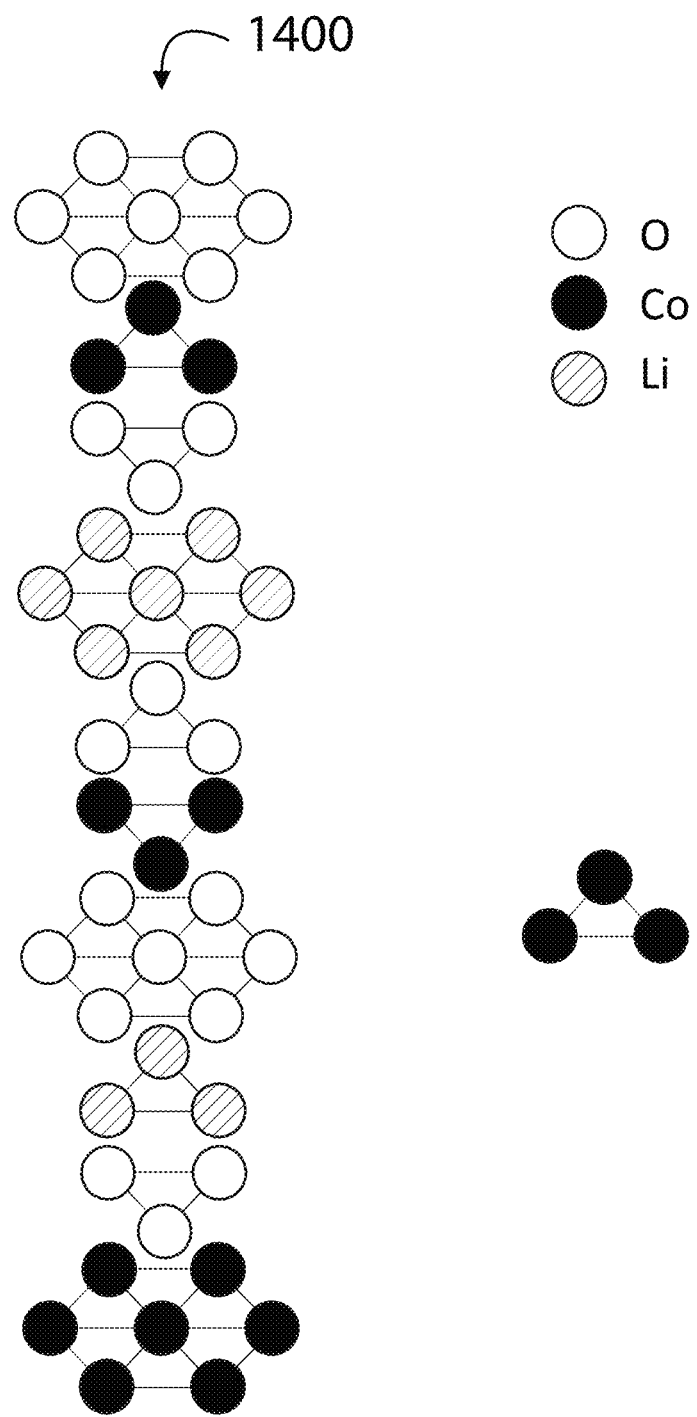
Figure 15:
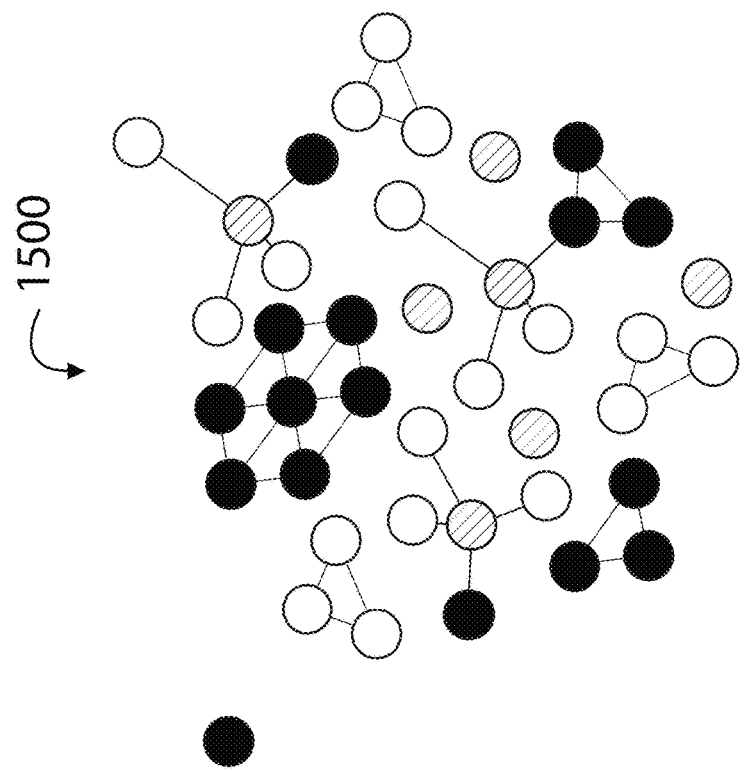
Figure 16:
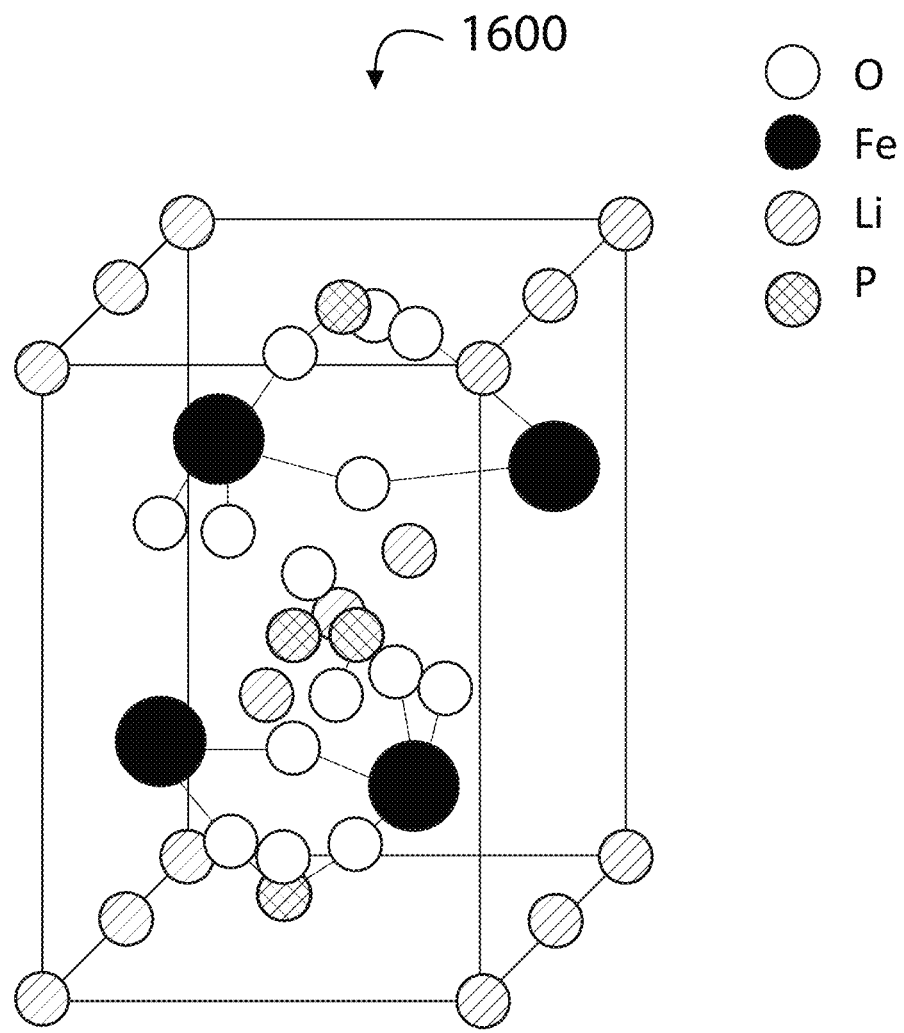
Figure 17:
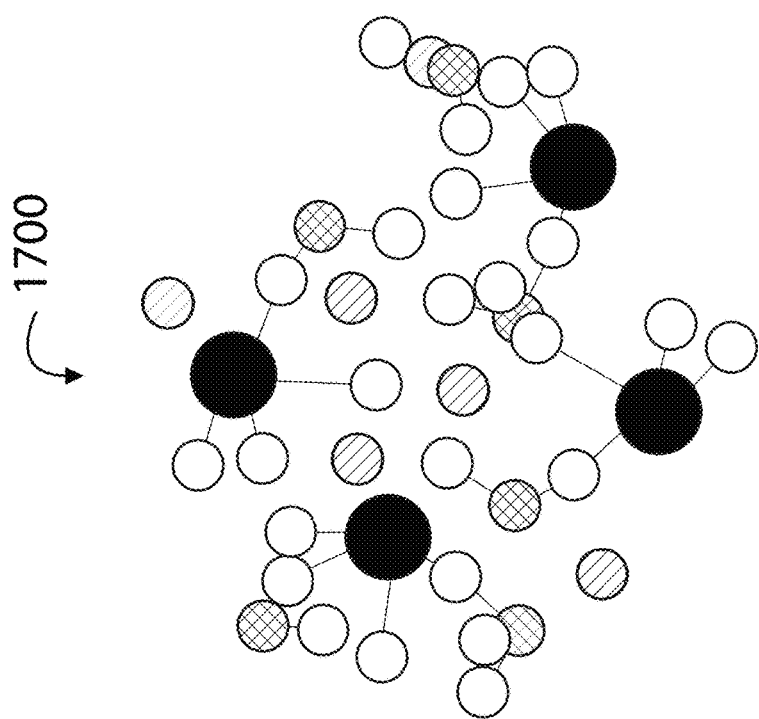
Figure 18:
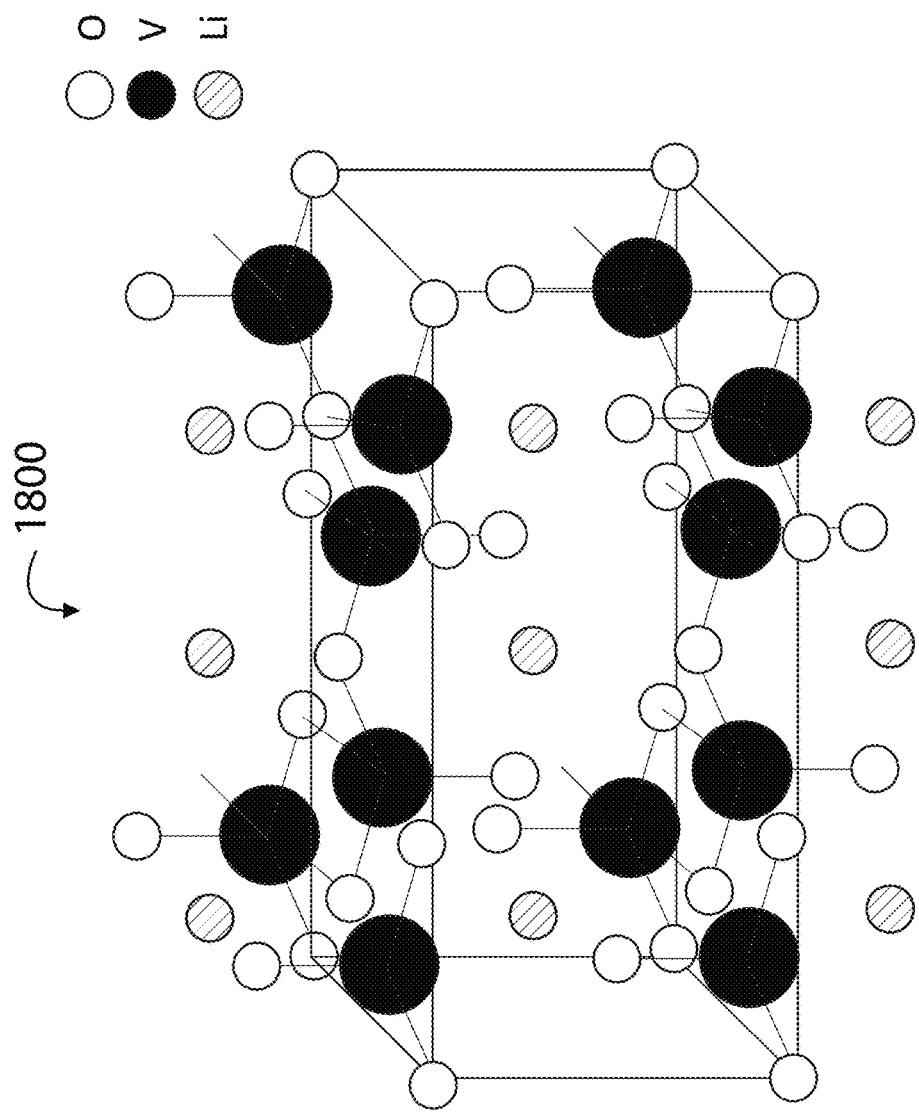
Figure 19:
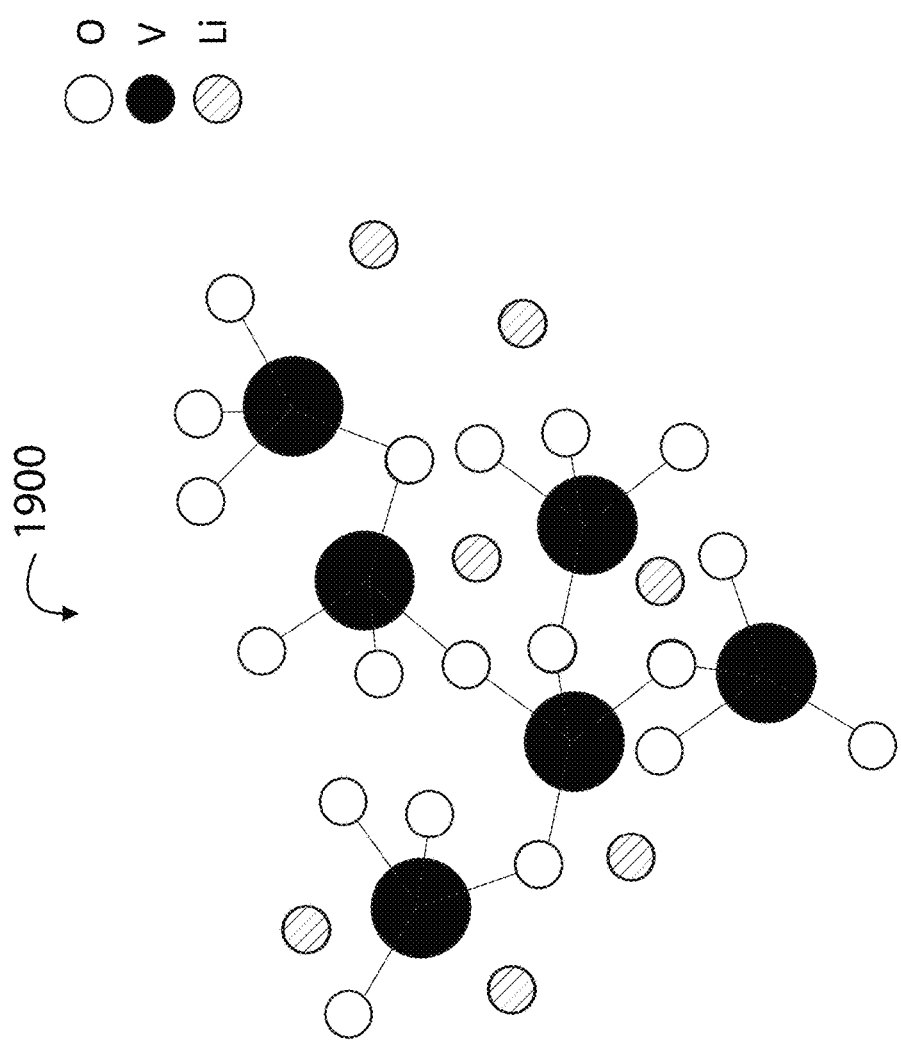

FIGS. 12-19 illustrate crystalline and amorphous structures for various lithium bearing species for cathode devices according to an embodiment of the present invention. FIGS. 12 and 13 shows the crystalline and amorphous structure for LiMn$_2$O$_4$, respectively. FIGS. 14 and 15 show the crystalline and amorphous structure for LiCoO$_2$, respectively. FIGS. 16 and 17 show the crystalline and amorphous structure for LiFePO$_4$, respectively. FIGS. 18 and 19 show the crystalline and amorphous structure for LiV$_2$O$_5$, respectively.

In an example, the present invention can include a method of designing and manufacturing a battery device. This method can include providing a first battery cell having a first design. This first design can have a first electrode member, a first cathode device characterized by a first structure and a first composition, an electrolyte, and a second electrode member. The first design can also be characterized by a first energy density value.

The method can also include determining a first diffusivity value of the cathode device, the first energy density value being directly associated with the first diffusivity value. The method can include adjusting the first cathode device to a plurality of cathode devices numbered from 2 through N, where N is an integer greater than 2. Each of the plurality of cathode devices can have a diffusivity value numbered from 2 through N. The method can also include selecting the diffusivity value having the highest value, in reference to the other diffusivity values, and associating the diffusivity value having the highest value with its cathode device.

Furthermore, the method can include designing a second battery cell having a second design. This second design can include the cathode device having the highest diffusivity value. The second battery device can have a higher energy density than all of the other battery devices having any of the other cathode devices. Then, this second battery device can be manufactured.

Figure 21:
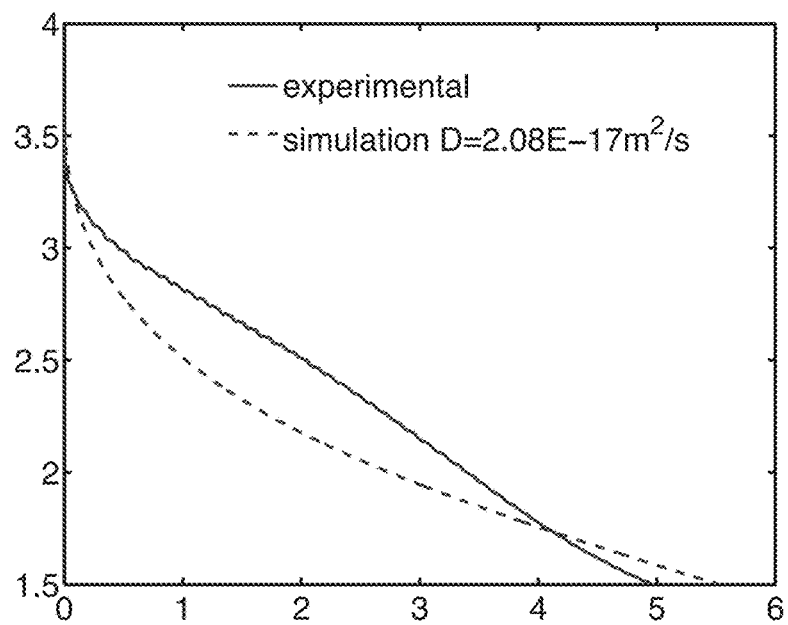
Figure 22:
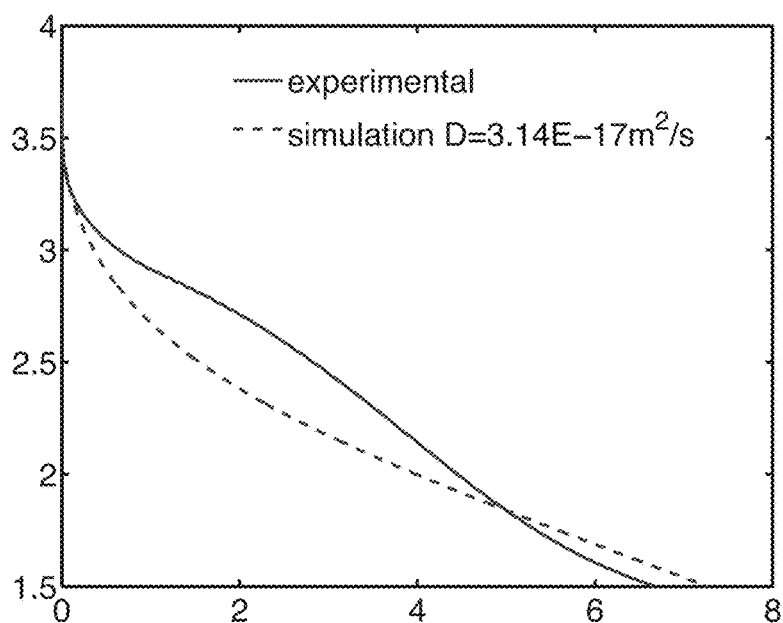

FIGS. 20-22 are values based upon experimental results according to examples of the present invention. FIG. 20 shows a table with diffusivity and energy density characteristics of two cell samples according to embodiments of the present invention. In an embodiment, the diffusivity of these materials is inversely determine by minimizing the difference between integrated energy values from experimental and simulated discharge curves.

FIG. 21 shows a graph of the related data for the first sample. This cell sample was provided on an ALO substrate. The dimensions for this cell sample were as follows: current collector (CC): 0.14 um, cathode (CA) 1.03 um, electrode (EL): 0.37 um, and anode (AN): 0.83 um.

FIG. 22 shows a graph of the related data for the second sample. This cell sample was provided on a glass substrate. The dimensions for this cell sample were as follows: current collector (CC): 0.11 um, cathode (CA) 1.09 um, electrode (EL): 0.49 um, and anode (AN): 0.9 um.

Figure 23:
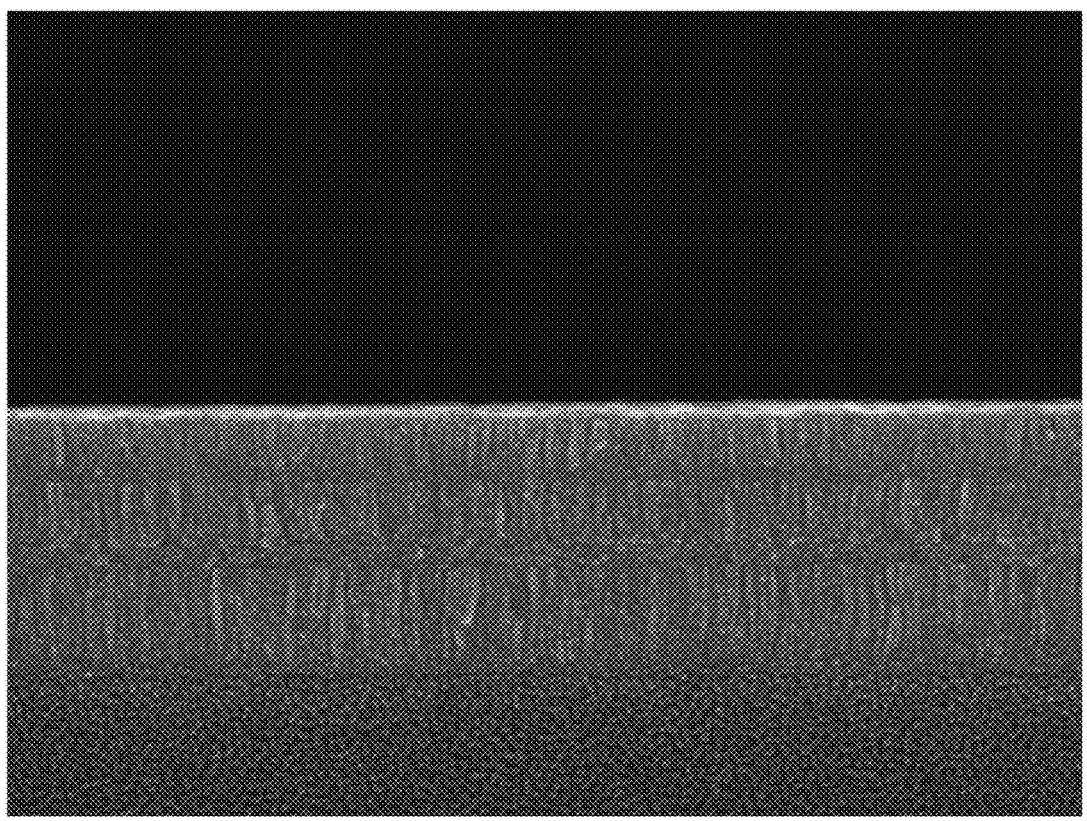
FIG. 23 illustrates an image of a cathode material in an example of the present invention.

FIG. 23 illustrates an image of a cathode material in an example of the present invention. As shown, the image represents a cathode material comprising a vanadium oxide bearing species. This cathode material is characterized by a 0 Wh/l energy density.

Figure 24:
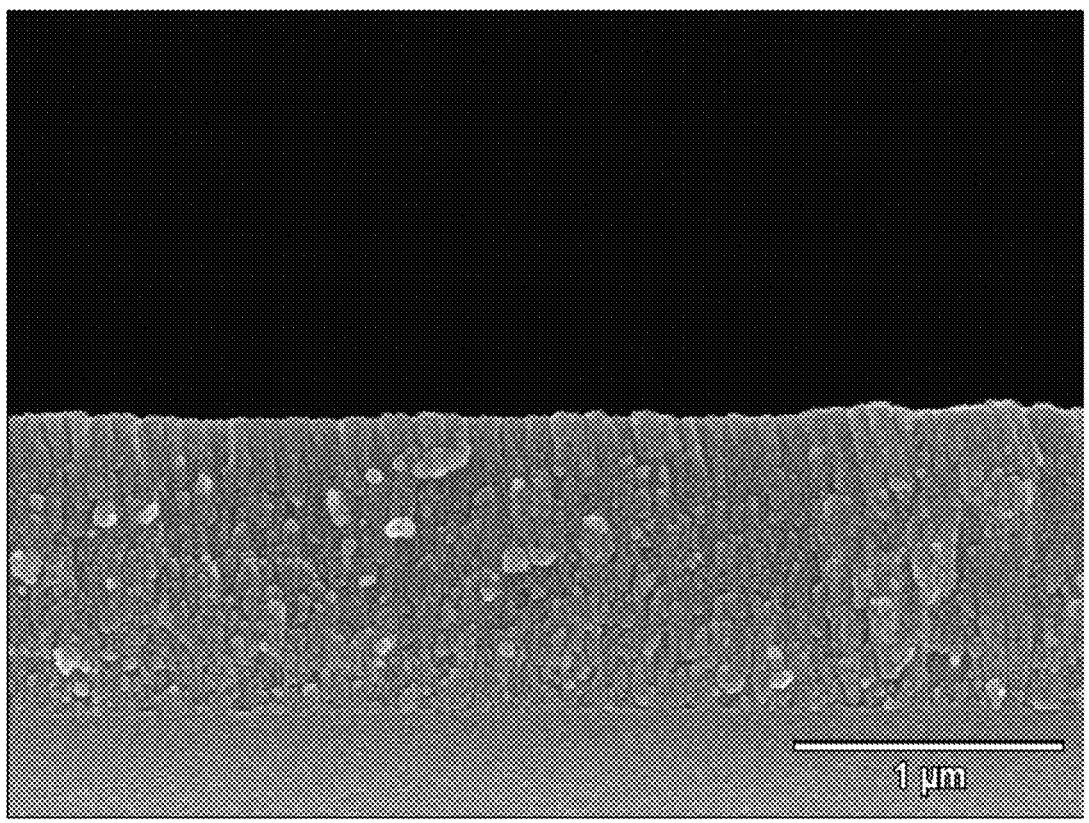
FIG. 24 illustrates an image of a cathode material in an alternative example of the present invention.

FIG. 24 illustrates an image of a cathode material in an alternative example of the present invention. This cathode material is characterized by a 547 Wh/l energy density.

Figure 25:
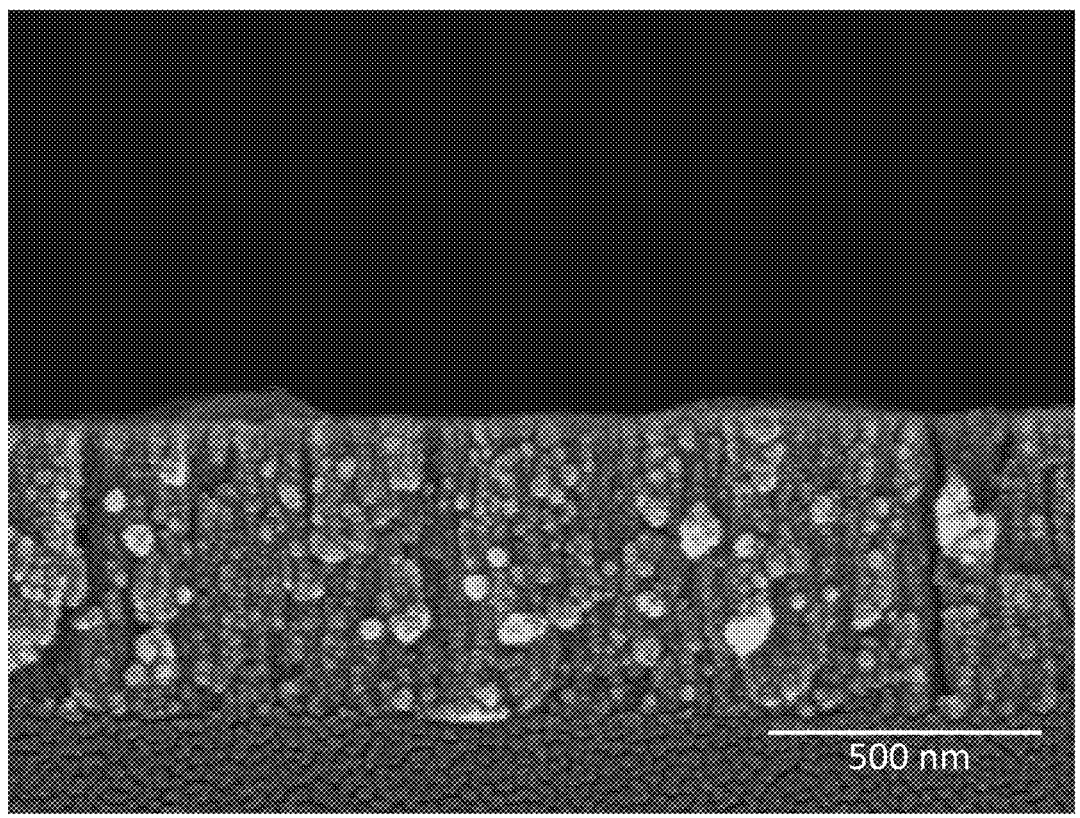
FIG. 25 illustrates an image of a cathode material in a preferred example of the present invention.

FIG. 25 illustrates an image of a cathode material in a preferred example of the present invention. This cathode material is characterized by a 680 Wh/l energy density.

It is also understood that the examples and embodiments described herein are for illustrative purposes only and that various modifications or changes in light thereof will be suggested to persons skilled in the art and are to be included within the spirit and purview of this application and scope of the appended claims.

What is claimed:

1. A method of fabricating a multilayered thin film solid state battery device, the method comprising:
   providing a substrate member, the substrate member comprising a surface region, the substrate member having a melting point temperature;
   forming a barrier material comprising a polymer material overlying the surface region, the barrier material being configured to substantially block a migration of an active metal species to the substrate member, and being characterized by a barrier degrading temperature;
   forming a first electrode material overlying the surface region;
   forming a thickness of cathode material having an amorphous characteristic, while maintaining a temperature of about −40 Degrees Celsius to no greater than 500 Degrees Celsius such that a spatial volume is characterized by an external border region of the cathode material, an effective diffusivity is characterizing the thickness of the cathode material and having a value ranging from 0.005 µm to 1000 µm, and a void region characterizing the thickness of cathode material, the void region being 0.001% to 20% of the spatial volume;
   forming an electrolyte configured overlying the thickness of cathode material;
   forming an anode material overlying the electrolyte;
   forming a second electrode material overlying the anode material; and
   transferring a thin film solid state battery device characterized by an energy density ranging from 50 Watt-hour/liter to 3000 Watt-hour/liter.

2. The method of claim 1, wherein the thickness of cathode material comprises a first thickness of amorphous material and a second thickness of material, the first thickness being greater than the second thickness, and the first thickness of amorphous material being different in structure than the second thickness of material.

3. The method of claim 1, wherein the thickness of cathode material comprises a first thickness of amorphous material and a second thickness of material, the first thickness being greater than the second thickness, and the first thickness of amorphous material being different in structure than the second thickness of material; whereupon the effective diffusivity comprises a first diffusivity of the first thickness and a second diffusivity of the second thickness.

4. The method of claim 1, wherein the thickness of cathode material comprises a plurality of pillar-like structures, each of which extends along a direction of the thickness, and substantially normal to a plane of the thickness of material and the surface region.

5. The method of claim 1, wherein the barrier material comprises a polymer material, the polymer material being a thickness ranging from 0.001 µm to 1 µm to compensate a strain between the first electrode member and the surface region; wherein the temperature is less than 900 Degrees Celsius.

6. The method of claim 1, wherein the cathode material comprises a lithium species, the lithium species being selected from at least one of LiSON, $Li_xLa_{1-x}ZrO_3$, $Li_xLa_{1-x}TiO_3$, $LiAlGePO_4$, $LiAlTiPO_4$, LiSiCON, $Li_{1.3}Al_{0.3}Ti_{1.7}(PO_4)_3$, $0.5LiTaO_{3+0.5}SrTiO_3$, $Li_{0.34}La_{0.51}TiO_{2.94}$, $LiAlCl_4$, $Li_7SiPO_8$, $Li_9AlSiO_8$, $Li_3PO_4$, $Li_3SP_4$, LiPON, $Li_7La_3Zr_2O_{12}$, $Li_{1.5}Al_{0.5}Ge_{1.5}(PO_4)_3$, $Li_6PS_5Cl$, or $Li_5Na_3Nb_2O_{12}$.

7. The method of claim 1, wherein the cathode material is characterized by a conductivity ranging from 1.E-6 S/m to 1.E 5 S/m.

8. The method of claim 1, wherein the cathode material is characterized by a C rate ranging from C/100 to 100 C.

9. The method of claim 1, wherein the cathode material is characterized by an XRD peak to total ratio ranging from 0% to 50% crystallinity.

10. The method of claim 1, wherein the cathode material is characterized by an average crystallite size ranging from 0.1 to 100 nm configured in a spatial region.

11. The method of claim 1, wherein the cathode material comprises a surface morphology.

12. The method of claim 1, wherein forming the cathode material comprises subjecting a source material to an energy source maintained in a vacuum environment to decompose the source material via evaporation to cause a deposition of cathode material.

13. The method of claim 1, wherein forming the cathode material comprises a plurality of pillar structures, each of the pillar structure having a base region and an upper region, each of the pillar structures comprising a plurality of smaller particle-like structures, each of the smaller particle like structures being configured within each of the pillar structures.

14. The method of claim 1, wherein the forming the cathode material comprises a plurality of pillar structures, each of the pillar structures having a base region and an upper region, each of the pillar structures comprising a plurality of particle-like structures, each of the particle like structures being configured within each of the pillar structures, each pair of pillar structures having a plurality of irregularly-shaped polyhedral structures provided between the pair of pillar structures.

15. The method of claim 1, wherein the forming of the cathode material comprises forming a plurality of first cone structures and a plurality of second cone structures such that the plurality of first cone structures is inter-digitated with the plurality of second cone structures.

16. The method of claim 1, wherein the cathode material comprises a plurality of discontinuities generally arranged in a direction from a first face of the cathode material to a second face of the cathode material.

17. The method of claim 1, wherein forming the cathode material comprises a plurality of nanotube structures, each of the nanotube structure having a base region and an upper region, and substantially arranged in a direction normal to an upper surface region and a lower surface region of the cathode material.

18. A multilayered thin film solid state battery device, the device comprising:
- a substrate member comprising a surface region, the substrate member having a melting point temperature;
- an electrode material overlying the surface region;
- a cathode material configured as an amorphous structure having an average particle size ranging from 0.05 μm to 100 μm;
- a spatial volume characterized by an external border region of the cathode material;
- a diffusivity characterizing the cathode material and having a value ranging from $1.E\text{-}18\ m^2/s$ to $1.E\text{-}12\ m^2/s$;
- a void region characterizing the cathode material, the void region being 0.001% to 20% of the spatial volume;
- an electrolyte configured overlying the cathode material;
- an anode material overlying the electrolyte; and
- an energy density of ranging from 100 Watt-hour/liter to 2000 Watt-hour/liter,
- wherein the cathode material comprises a plurality of pillar structures, each of the pillar structures having a base region and an upper region, each of the pillar structures comprising a plurality of particle-like structures, each of the particle like structures being configured within each of the pillar structures, each pair of pillar structures having a plurality of irregularly-shaped polyhedral structures provided between the pair of pillar structures.

19. A method of designing and manufacturing a battery device, the method comprising:
- providing a first battery cell having a first design, the first design having a first electrode member, a first cathode device characterized by a first structure and a first composition, an electrolyte, and a second electrode member; and a first energy density value;
- determining a first diffusivity value of the cathode device, the first energy density value being directly associated with the first diffusivity value;
- adjusting the first cathode device to a plurality of cathode devices numbered from 2 through N, where N is an integer greater than 2, each of the plurality of cathode devices having a diffusivity value numbered from 2 through N;
- selecting the diffusivity value having a highest value, in reference to the other diffusivity values, and associating the diffusivity value having the highest value with its cathode device;
- designing a second battery cell having a second design, the second design having the cathode device having the highest diffusivity value, the second battery device having a higher energy density than all of the other battery devices having any of the other cathode devices; and
- manufacturing the second battery device.

* * * * *

UNITED STATES PATENT AND TRADEMARK OFFICE
CERTIFICATE OF CORRECTION

PATENT NO. : 9,627,709 B2
APPLICATION NO. : 14/514779
DATED : April 18, 2017
INVENTOR(S) : Ann Marie Sastry et al.

It is certified that error appears in the above-identified patent and that said Letters Patent is hereby corrected as shown below:

On the Title Page

Item (72) Inventors:
Please replace "Myoundo CHUNG" with --Myoungdo CHUNG--

Signed and Sealed this
Ninth Day of April, 2019

Andrei Iancu
*Director of the United States Patent and Trademark Office*